United States Patent
Akahira et al.

(10) Patent No.: US 6,224,205 B1
(45) Date of Patent: May 1, 2001

(54) COLOR-FILTER MANUFACTURING METHOD AND APPARATUS, COLOR FILTER, DISPLAY DEVICE, AND APPARATUS HAVING DISPLAY DEVICE

(75) Inventors: Makoto Akahira, Kawasaki; Hiroshi Sugitani, Machida; Hiroshi Sato, Yokohama; Katsuhiro Shirota, Kawasaki; Koichiro Nakazawa, Tokyo; Hiromitsu Yamaguchi, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/687,985

(22) Filed: Jul. 29, 1996

(30) Foreign Application Priority Data

Jul. 31, 1995 (JP) .................................................. 7-195235
Jul. 10, 1996 (JP) .................................................. 8-180564

(51) Int. Cl.⁷ ................................. B41J 2/01; B41J 29/38
(52) U.S. Cl. ............................................... 347/107; 347/5
(58) Field of Search ............................. 347/107, 73, 57, 347/20, 6, 59

(56) References Cited

U.S. PATENT DOCUMENTS

| | | | |
|---|---|---|---|
| 3,995,282 | * 11/1976 | d'Alton-Rauch et al. | 347/54 |
| 4,313,124 | 1/1982 | Hara | 347/57 |
| 4,345,262 | * 8/1982 | Shirato et al. | 347/57 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 5,032,851 | 7/1991 | Yoshimura | 346/140 R |
| 5,285,298 | 2/1994 | Kaneko et al. | 359/43 |
| 5,576,070 | * 11/1996 | Yaniv | 427/510 |
| 5,576,760 | * 11/1996 | Yaniv | 427/510 |
| 5,670,205 | * 9/1997 | Miyazaki et al. | 427/64 |
| 5,726,724 | 3/1998 | Shirota et al. | 349/106 |

FOREIGN PATENT DOCUMENTS

| | | | |
|---|---|---|---|
| 0655631 | 5/1995 | (EP) . | |
| 54-056847 | 5/1979 | (JP) . | |
| 55-132260 | 10/1980 | (JP) | B41J/3/04 |
| 59-075205 | 4/1984 | (JP) . | |
| 59-123670 | 7/1984 | (JP) . | |
| 59-138461 | 8/1984 | (JP) . | |
| 60-071260 | 4/1985 | (JP) . | |
| 61-274949 | 12/1986 | (JP) . | |
| 62-013357 | 1/1987 | (JP) . | |
| 63-235901 | 9/1988 | (JP) . | |
| 1-217320 | 8/1989 | (JP) . | |
| 4-129746 | 4/1992 | (JP) . | |
| 7-146406 | 6/1995 | (JP) | G02B/5/20 |

* cited by examiner

*Primary Examiner*—John Barlow
*Assistant Examiner*—Juanita Stephens
(74) *Attorney, Agent, or Firm*—Fitzpatrick, Cella, Harper & Scinto

(57) ABSTRACT

A color-filter manufacturing method which manufactures a color filter where occurrence of color mixture and colorless portion(s) are prevented while improving ink-arrival precision in applying ink onto a substrate. The method manufactures a color filter by discharging ink from an ink-jet head IJH on a substrate 53 so as to color respective pixels with a plurality of discharge ink. When ink I2 discharged from the ink-jet head IJH is applied not in the form of ink droplet but in the form of pillar onto the substrate 53, the ink I2 is applied at a position within a pixel, where the ink I2 is to mix with previously-applied ink I1.

10 Claims, 23 Drawing Sheets

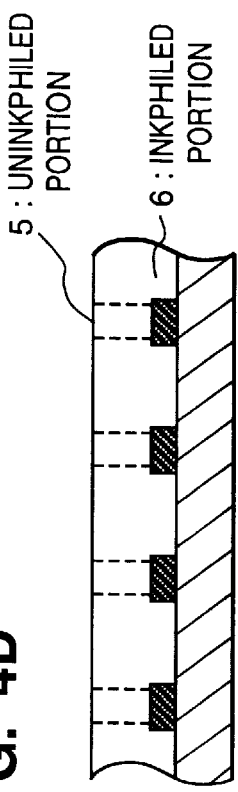
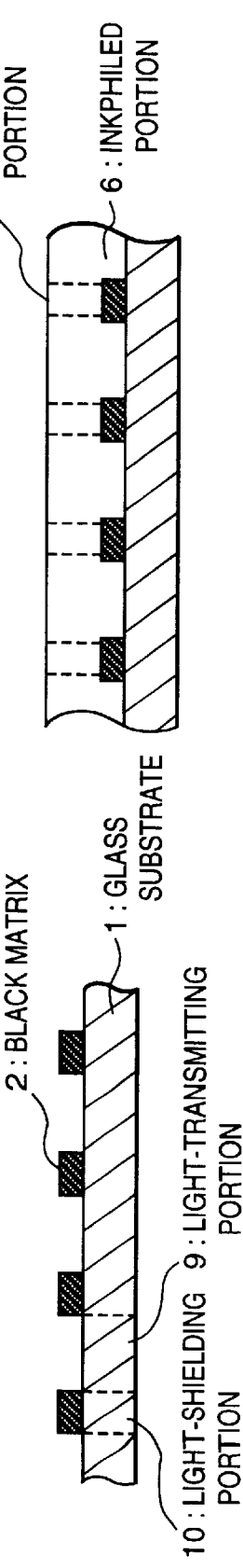
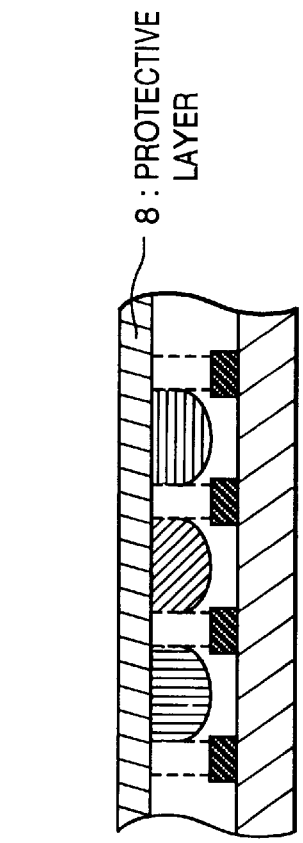
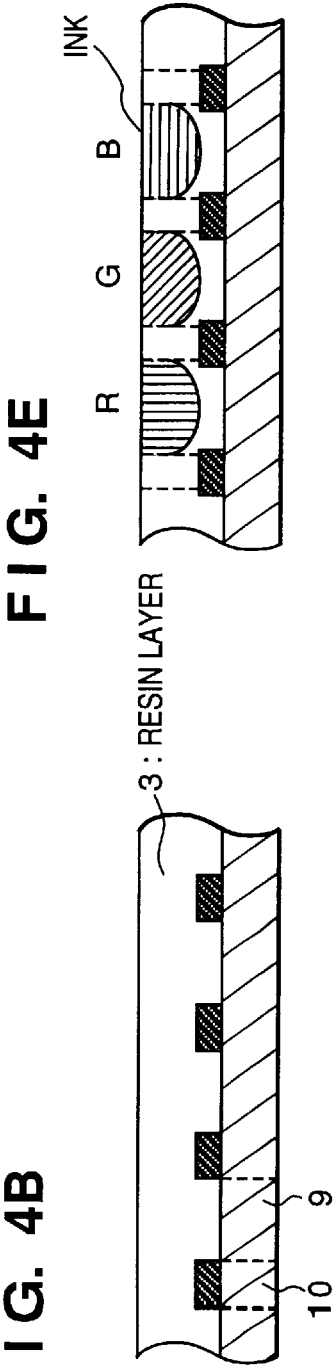
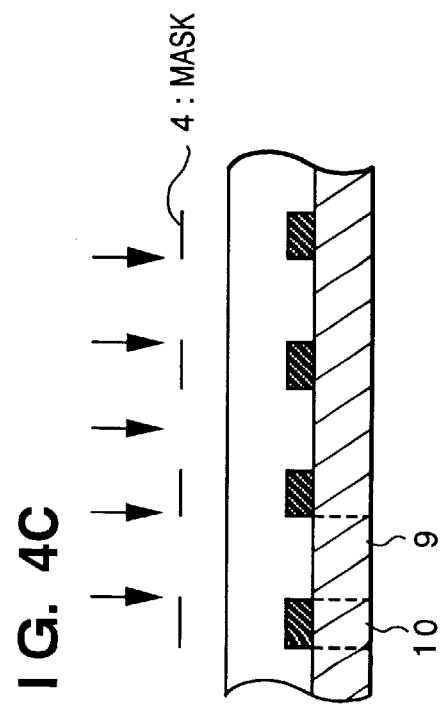

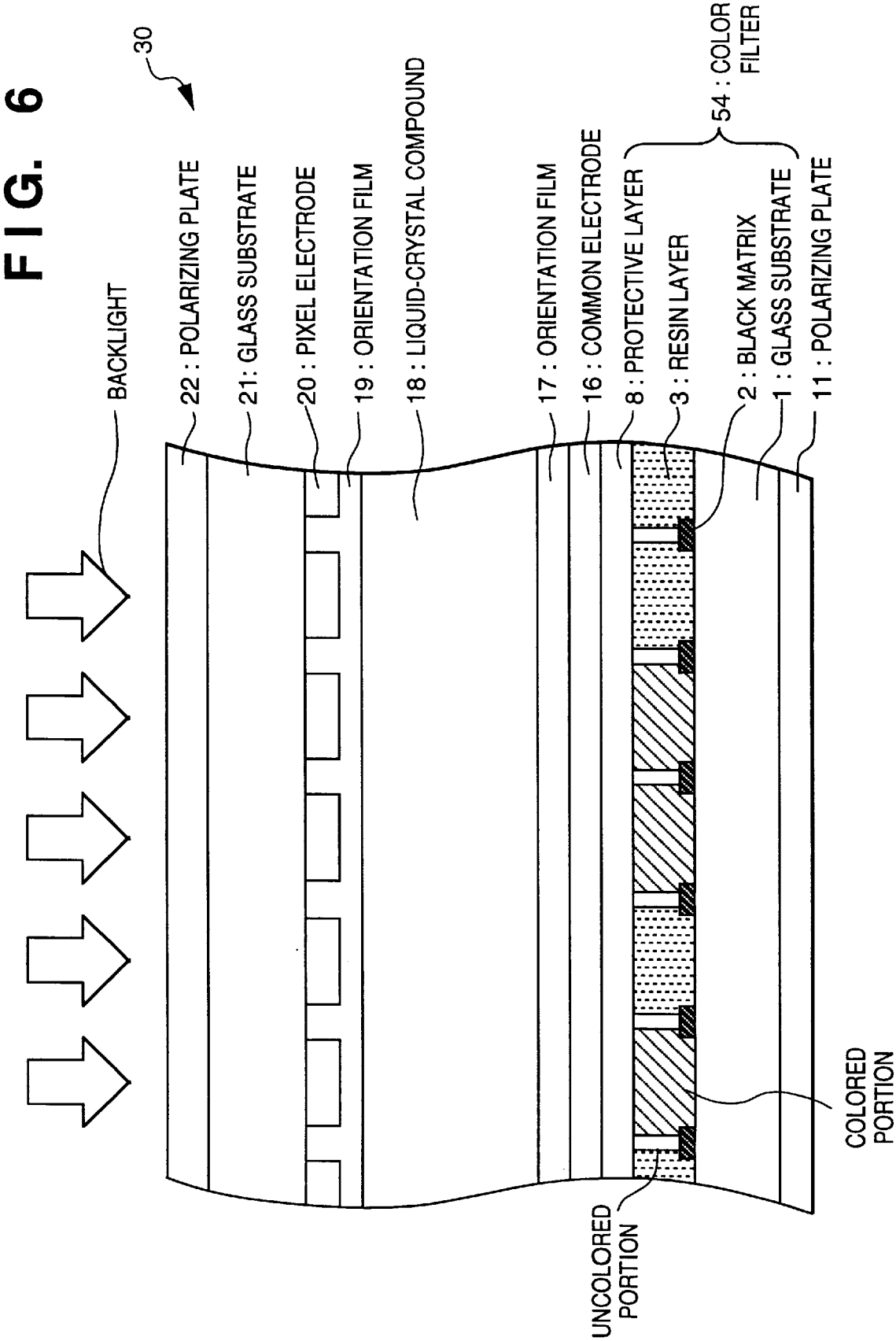

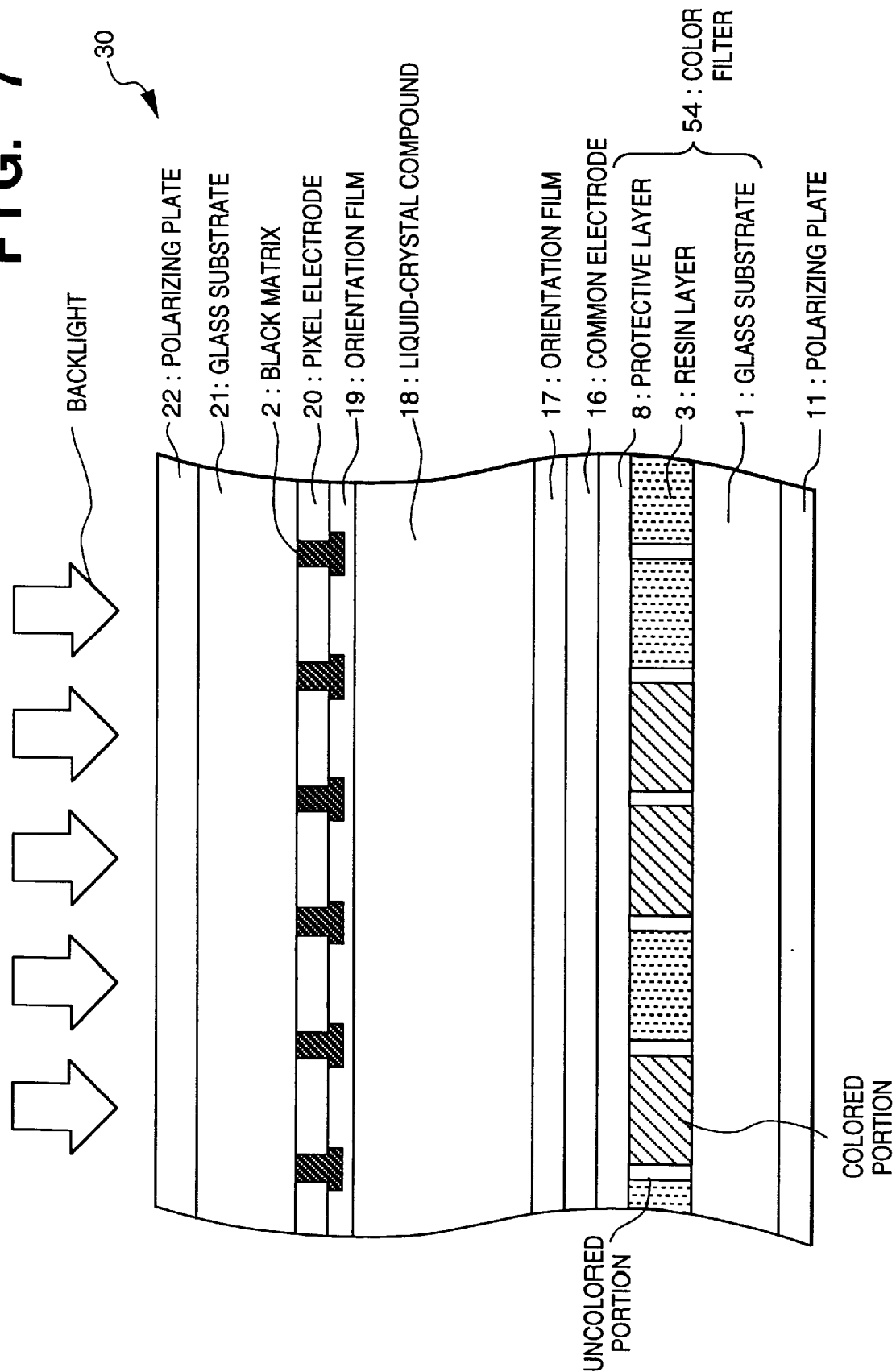

FIRST DISCHARGE

SECOND DISCHARGE

ALREADY-APPLIED INK
IS NOT IN LIQUID STATE

ALREADY-APPLIED INK
IS IN LIQUID STATE

ALREADY-APPLIED INK
IS NOT IN LIQUID STATE

ALREADY-APPLIED INK
IS IN LIQUID STATE

FIG. 22

COMPOSITION OF INK

| No. | ETHYLENE GLYCOL (wt %) | DYE AB90 (wt %) | CYCLOHEXANOL (wt %) | WATER (wt %) | SURFACE TENSION (dyne/cm) | LIQUID PILLAR (μm) |
|---|---|---|---|---|---|---|
| 1 | 20.0 | 5.0 | 0.0 | 75.0 | 47.3 | 400.09 |
| 2 | 20.0 | 5.0 | 0.2 | 74.8 | 46 | 424.76 |
| 3 | 20.0 | 5.0 | 0.5 | 74.5 | 44.9 | 438.86 |
| 4 | 20.0 | 5.0 | 1.0 | 74.0 | 43.4 | 539.33 |
| 5 | 20.0 | 5.0 | 3.0 | 72.0 | 38.2 | 571.05 |
| 6 | 20.0 | 5.0 | 5.0 | 70.0 | 35.8 | 548.14 |
| 7 | 20.0 | 5.0 | 7.0 | 68.0 | 34.4 | 534.04 |

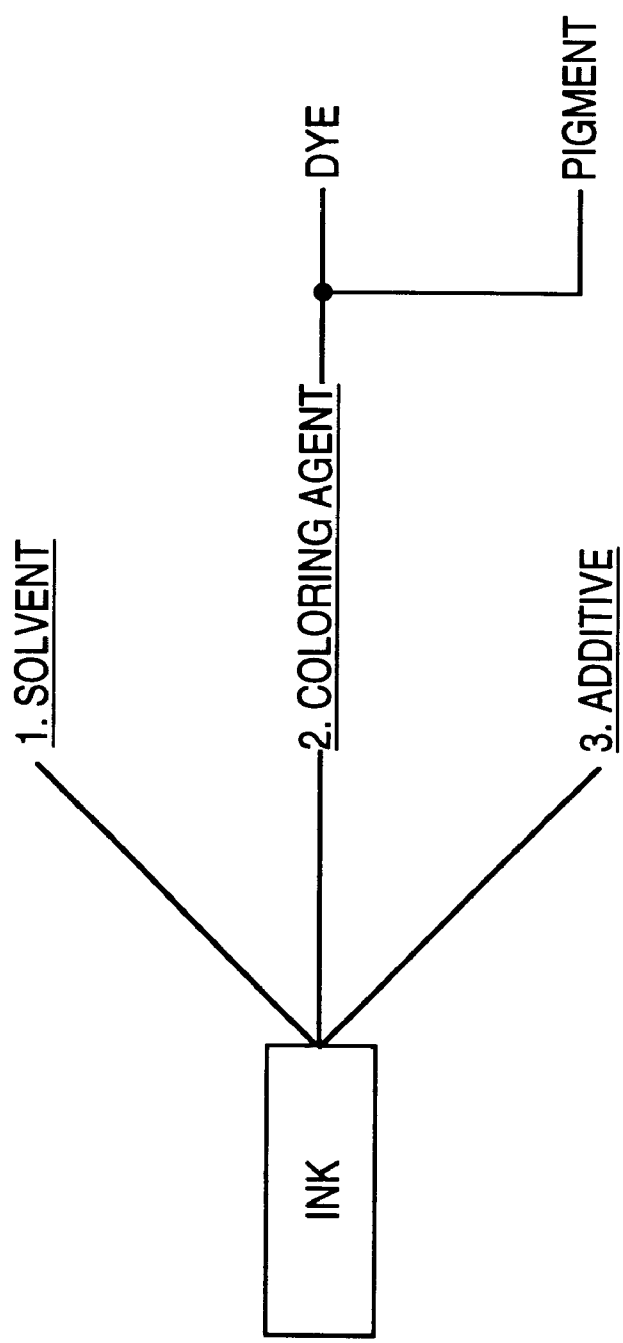

FIG. 28

| SOLVENT | BOILING POINT (°C) |
|---|---|
| N, N-DIMETHYLFORMAMID | 153.0 |
| N, N-DIETHANOLAMINE | 162.1 |
| N, N-DIMETHYLACETAMID | 166.1 |
| 2-(METHOXMETHOX) ETHANOL | 167.5 |
| DIACETONE ALCOHOL | 168.1 |
| FURFURYL ALCOHOL | 170.0 |
| MONOETHANOL AMINE | 171.0 |
| N,N-DIETHYLFORMAMID | 177.0 |
| TETRAHYDROFURFURYL ALCOHOL | 178.0 |
| N-METHYLFORMAMID | 180.0 |
| 2, 3-BUTANDIOL | 182.0 |
| ETHYLENE GLYCOL MONOACETATE | 182.0 |
| GLYCERINMONOACETATE | 182.0 |
| 1, 2-PROPANEDIOL | 187.3 |
| DIPROPYLENE GLYCOL MONOMETHYLETHER | 190.0 |
| 1, 2-BUTANEDIOL | 190.5 |
| DIETHYLENE GLYCOL MONOMETHYLETHER | 194.1 |
| 2-METHYL-2, 4-PENTANEDIOL | 197.1 |
| DIPROPYLENE GLYCOL MONOETHYLETHER | 197.8 |
| ETHYLENE GLYCOL | 197.9 |
| N-METHYL-2-PYRROLIDONE | 202.0 |
| DIETHYLENE GLYCOL MONOETHYLETHER | 202.0 |
| γ-BUTYROLACTONE | 204.0 |
| N-METHYLACETAMID | 206.0 |
| 1, 3-BUTANEDIOL | 207.5 |
| FORMAMID | 210.5 |
| 1, 3-PROPANEDIOL | 214.0 |
| ACETAMID | 221.2 |
| 1, 4-BUTANEDIOL | 229.2 |
| DIETHYLENE GLYCOL MONOBUTYLETHER | 230.4 |
| DIPROPYLENE GLYCOL | 231.8 |
| 2-BUTEN-1, 4-DIOL | 235.0 |
| ETHYLENE CARBONATE | 238.0 |

COLOR-FILTER MANUFACTURING METHOD AND APPARATUS, COLOR FILTER, DISPLAY DEVICE, AND APPARATUS HAVING DISPLAY DEVICE

BACKGROUND OF THE INVENTION

1. Field of the Invention

This invention relates to a color-filter manufacturing method and apparatus for manufacturing a color filter by discharging ink from an ink-jet head on a substrate, thus coloring respective pixels with a plurality of discharge ink, a color filter, a display device, and an apparatus having the display device.

With recent development of personal computers, especially portable personal computers, there is an increasing need for liquid-crystal displays (LCDs), above all, color LCDs. However, for more popularized use of these displays, it is necessary to reduce manufacturing costs of the displays, above all, to reduce manufacturing costs of color filters which take significantly large part of the costs.

Conventionally, various methods have been proposed to meet the above requirements by providing necessary color-filter characteristics, however, none has been established as a solution to satisfy all the necessary characteristics. Known examples of these methods are as follows.

2. Description of Related Art

The most popular first method is a coloring method. This method forms an RGB color filter layer by: (1) applying water-soluble polymer material as coloring material onto a glass substrate; (2) patterning a desired shape by a photolithography process; (3) dipping the obtained pattern into a coloring bath; and (4) repeating the process through steps (1) to (3) thrice.

The second method is a pigment-dispersion method which is replacing the coloring method. This method forms an RGB color filter layer by: (1) forming a photosensitive resin layer where pigment is dispersed on a substrate; (2) patterning a pattern for single color; and (3) repeating the process through steps (1) and (2) thrice.

The third method is an electrodeposition method. This method forms an RGB color filter by: (1) patterning a transparent electrode on a substrate; (2) dipping the substrate on which the transparent electrode has been formed into electrodeposition coating fluid containing pigment, resin, electrolyte and the like to electrodeposit a first color; (3) repeating the process through steps (1) and (2) thrice to obtain an RGB color filter layer; and (4) calcining the color filter.

The fourth method is a printing method. This method forms an RGB color filter by: (1) dispersing, as printing, pigment on thermosetting resin; (2) repeating printing thrice to apply three R, G and B colors; and (3) heat-setting the resin to form colored layer.

Note that any of these methods usually forms a protective layer on the colored layer.

A common problem to these methods is to repeat the same process with respect to three R, G and B colors, which increases costs. In addition, as the number of processes increases, the yield decreases. In the electrodeposition method, as the formable pattern shapes are limited, the technique cannot be applied to manufacture of TFTs. In the printing method, as resolution and smoothness in printing are poor, fine-pitch patterns cannot be formed.

To compensate for these drawbacks, Japanese Patent Application Laid-Open No. 59-75205, Japanese Patent Application Laid-Open No. 63-235901, or Japanese Patent Application Laid-Open No. 1-217320 discloses a method for manufacturing a color filter by using an ink-jet method. This method forms a color filter by discharging R (red), G (green) and B (blue) color ink onto a light-transmitting type substrate, and drying the respective color ink to form a colored pixel portion. The ink-jet method greatly simplifies manufacture process and reduces costs by forming respective RGB pixels at once.

However, in the conventional ink-jet color-filter manufacturing method, the ink is discharged from an ink-jet head in the form of droplets. Accordingly, ink droplets are separated from discharge nozzles at irregular timings, which causes variation in ink-discharge speeds at the respective discharge nozzles. While scanning the ink-jet head, otherwise scanning a stage under a fixed ink-jet head for coloring a color-filter substrate, this variation in ink-discharge speeds might shift ink-arrival positions on the color-filter substrate, thus might cause mixture of colors due to ink-arrival at a neighboring position to a target position, or cause uncolored portion(s) due to omission of coloring a desired pixel.

On the other hand, Japanese Patent Application Laid-Open No. 61-274949 or Japanese Patent Application Laid-Open No. 4-129746 discloses, not discharging ink in the form of ink droplets, but applying ink in the form of pillars before the ink separate from the nozzles of the ink-jet head. As ink in the form of pillars are applied to a coloring object, ink portion unnecessary for actual coloring is drawn back into the nozzles when the ink is separated from the nozzles. This controls the amounts of ink not to exceed necessary amounts, and enables coloring small-diameter dots. Further, since this method does not discharge ink droplets in the air, it is advantageous in the point that only low drive energy is required. Furthermore, as the ink is not separated from the discharge nozzles in the form of droplets, the aforementioned variation in ink-discharge speeds due to shifting of ink-separation timings does not occur.

However, both Japanese Patent Application Laid-Open No. 61-274949 and Japanese Patent Application Laid-Open No. 4-129746 are directed to printing on recording media such as print sheets, but none of them discloses application to manufacture of color-filters.

SUMMARY OF THE INVENTION

The present invention has been made in consideration of the above situation, and has its object to provide a color-filter manufacturing method and apparatus which manufactures a color filter while preventing mixture of colors or omission of coloring, with improvement in ink-arrival precision on a color-filter substrate.

Another object of the present invention is to provide a color filter without color mixture or uncolored pixel(s), a display device using the color filter, and an apparatus having the display device.

According to the present invention, the foregoing objects are attained by providing a color-filter manufacturing method for manufacturing a color filter by discharging ink from an ink-jet head on a substrate so as to color respective pixels with a plurality of discharge ink, comprising the step of: discharging ink, not in the form of droplets but in continuously connected form, from the ink-jet head, the ink having the same color as that of previously-applied ink, to be applied at a position within a pixel, where the ink is to mix with the previously-applied ink.

In accordance with the first aspect of the present invention, a color-filter manufacturing apparatus having the following construction can be provided. That is a color-filter manufacturing apparatus for manufacturing a color filter by discharging ink from an ink-jet head on a substrate so as to color respective pixels with a plurality of discharge ink, comprising: an ink-jet head for discharging ink, not in the form of droplets but in continuously connected form, to be applied onto the substrate; and control means for controlling the ink-jet head so as to discharge ink having the same color as that of previously-applied ink, to be applied at a position within a pixel, where the ink is to mix with the previously-applied ink.

Further, the color filter according to the present invention is a color filter manufactured by discharging ink from an ink-jet head on a substrate so as to color respective pixels with a plurality of discharge ink, wherein ink is discharged from the ink-jet head, not in the form of droplets but in continuously connected form, the ink having the same color as that of previously-applied ink, and applied at a position within a pixel, where the ink is to mix with the previously-applied ink.

Further, the display device using the color filter according to the present invention is a display device having a color filter manufactured by discharging ink from an ink-jet head on a substrate so as to color respective pixels with a plurality of discharge ink, integrally comprising: a color filter colored by discharging ink from the ink-jet head, not in the form of droplets but in continuously connected form, to be applied onto the substrate, the ink having the same color of that of previously-applied ink, at a position within a pixel, where the ink is to mix with the previously-applied ink; and light-amount change means for changing light amount.

Further, the apparatus having the display device according to the present invention is an apparatus comprising a display device having a color filter manufactured by discharging ink from an ink-jet head on a substrate so as to color respective pixels with a plurality of discharge ink, integrally comprising: a display device integrally comprising a color filter colored by discharging ink from the ink-jet head, not in the form of droplets but in continuously connected form, to be applied onto the substrate, the ink having the same color of that of previously-applied ink, at a position within a pixel, where the ink is to mix with the previously-applied ink, and light-amount change means for changing light amount; and image-signal supply means for supplying an image signal to the display device.

In accordance with the second aspect of the present invention, a color-filter manufacturing method having the following construction can be provided. That is a color-filter manufacturing method for manufacturing a color filter by discharging ink from an ink-jet head on a substrate so as to color respective pixels with a plurality of discharge ink, comprising the step of: discharging ink from the ink-jet head, not in the form of droplets but in continuously connected form, to be applied onto the substrate.

In accordance with the second aspect of the present invention, the color-filter manufacturing apparatus is a color-filter manufacturing apparatus for manufacturing a color filter by discharging ink from an ink-jet head on a substrate so as to color respective pixels with a plurality of discharge ink, comprising, wherein ink is discharged, not in the form of droplets but in continuously connected form, to be applied onto the substrate.

Further, a method for reducing mixture of colors between pixels of the color filter according to the present invention can be provided. That is a method for reducing color mixture between pixels of a color filter in case of manufacturing the color filter by discharging ink from an ink-jet head on a substrate so as to color respective pixels with a plurality of discharge ink, comprising the step of: applying ink discharged from the ink-jet head, not in the form of droplets but in continuously connected form, onto the substrate.

Further, a method for improving precision of applying ink to the color filter according to the present invention can be provided. That is a method for improving precision of ink-arrival positions on a color filter in case of manufacturing the color filter by discharging ink from an ink-jet head on a substrate so as to color respective pixels with a plurality of discharge ink, comprising the step of: applying ink discharged from the ink-jet head, not in the form of droplets but in continuously connected form, onto the substrate.

Further, a method for reducing unevenness in coloring pixels of the color filter according to the present invention can be provided. That is a method for reducing coloring unevenness in pixels of a color filter in case of manufacturing the color filter by discharging ink from an ink-jet head on a substrate so as to color respective pixels with a plurality of discharge ink, comprising the step of: discharging ink, not in the form of droplets but in continuously connected form, from the ink-jet head, the ink having the same color as that of previously-applied ink, to be applied at a position within a pixel, where the ink is to mix with the previously-applied ink.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4F are explanatory views showing an example of color-filter manufacturing process;

FIGS. 6 and 7 are cross-sectional views respectively showing the basic structure of a color LCD device in which the color filter according to the embodiment is integrated;

FIG. 22 is a table showing the relation between composition, surface tension and length of liquid pillar of ink;

FIG. 27 is a tree showing the composition of ink; and

FIG. 28 is a table showing ink solvents.

DETAILED DESCRIPTION OF THE PREFERRED EMBODIMENTS

Preferred embodiments of the present invention will now be described in detail in accordance with the accompanying drawings.

Figure 1:
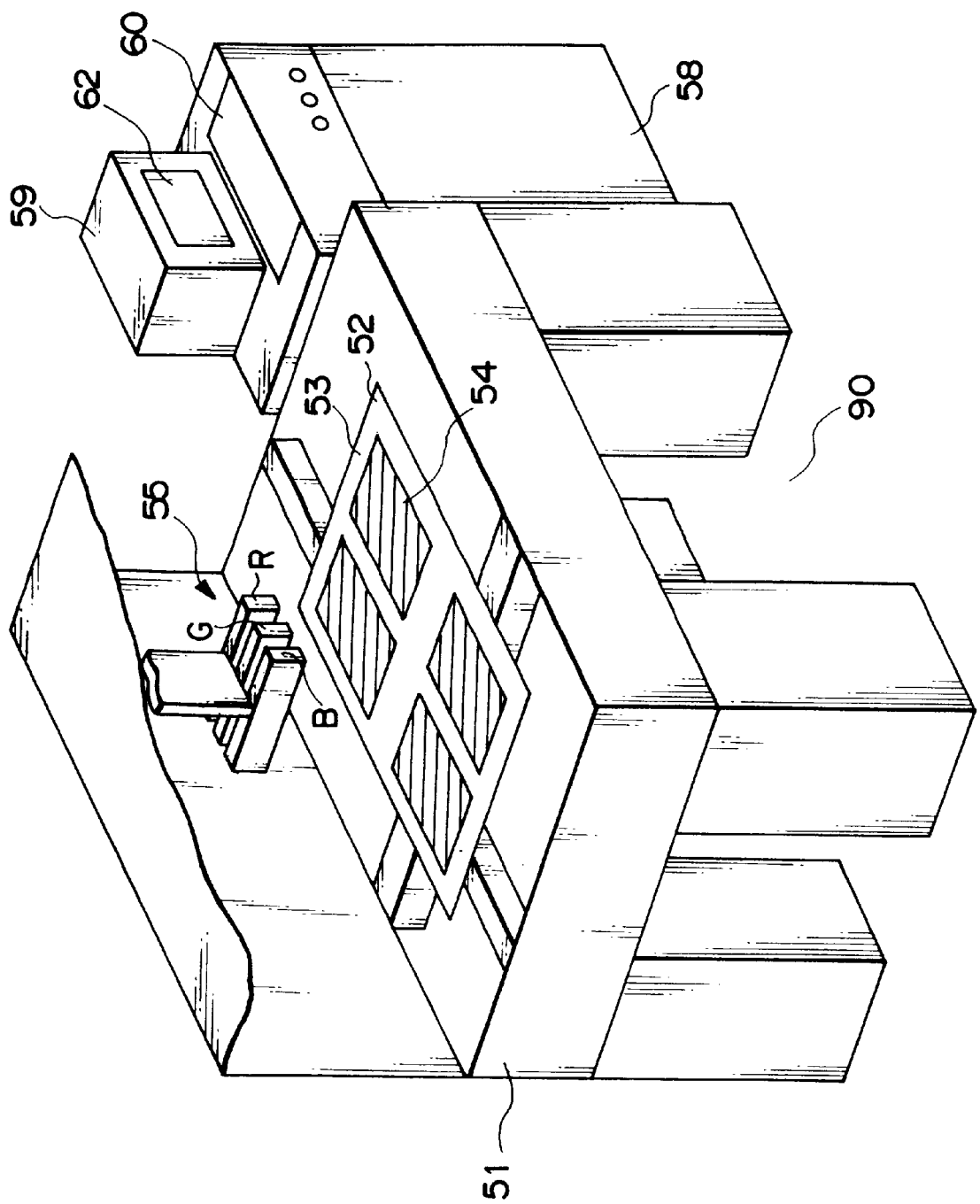
FIG. 1 is a perspective view showing a structure of a color-filter manufacturing apparatus according to an embodiment of the present invention.

FIG. 1 is a perspective view showing a structure of a color-filter manufacturing apparatus according to an embodiment of the present invention.

In FIG. 1, reference numeral 51 denotes a platform; 52, an XYθ stage provided on the platform 51; 53, a color-filter substrate set on the XYθ stage 52; 54, a color filter formed on the color-filter substrate 53; 55, ink-jet heads respectively containing R (red), G (green) and B (blue) ink for coloring the color filter 54; 58, a controller for controlling the overall operation of a color-filter manufacturing apparatus 90; 59, a teaching pendant (personal computer) as a display unit of the controller 58; and 60, a keyboard as an operation panel of the teaching pendant 59.

Figure 2:
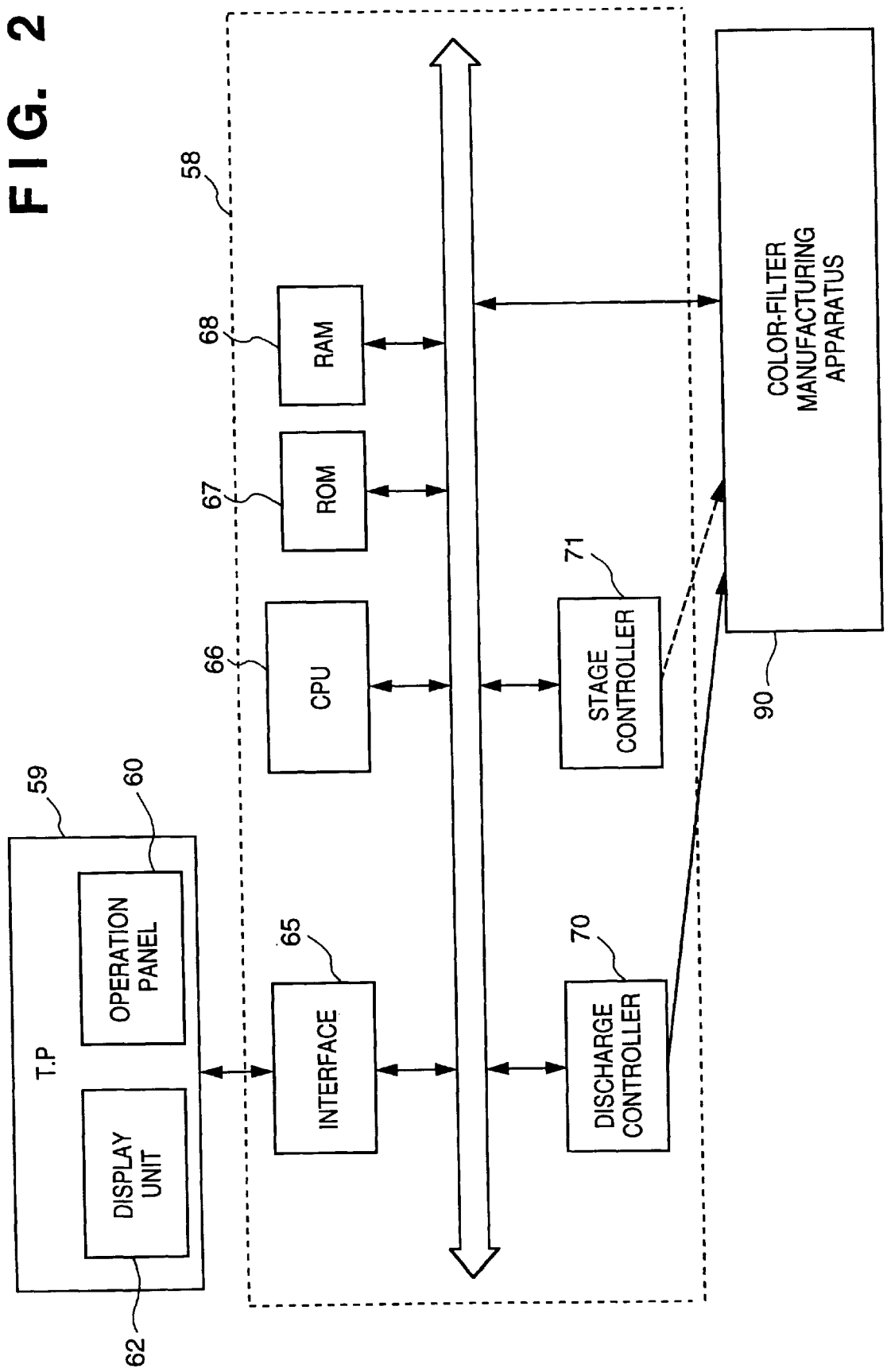
FIG. 2 is a block diagram showing a construction of a controller for controlling operation of the color-filter manufacturing apparatus.

FIG. 2 is a block diagram showing the construction of the controller 58 for controlling operation of the color-filter manufacturing apparatus 90. In FIG. 2, the teaching pendant 59 serves as input-output means of the controller 58. Numeral 62 denotes a display unit which displays information such as progress of manufacture or abnormality of the ink-jet heads. The keyboard 60 serves as an operation panel for designating operation of the color-filter manufacturing apparatus 90 and the like.

The controller 58 controls the overall operation of the color-filter manufacturing apparatus 90. Numeral 65 denotes an interface unit for data transfer between the teaching pendant 59; 66, a CPU which controls the color-filter manufacturing apparatus 90; 67, a ROM in which control programs for operating the CPU 66 are stored; 68, a RAM for storing production information and the like; 70, a discharge controller which controls ink discharge to the respective pixels of the color filter; 71, a stage controller which controls the operation of the XYθ stage 52 of the color-filter manufacturing apparatus 90. The color-filter manufacturing apparatus 90 is connected to the controller 58, and operates in accordance with instructions from the controller 58.

Figure 3:
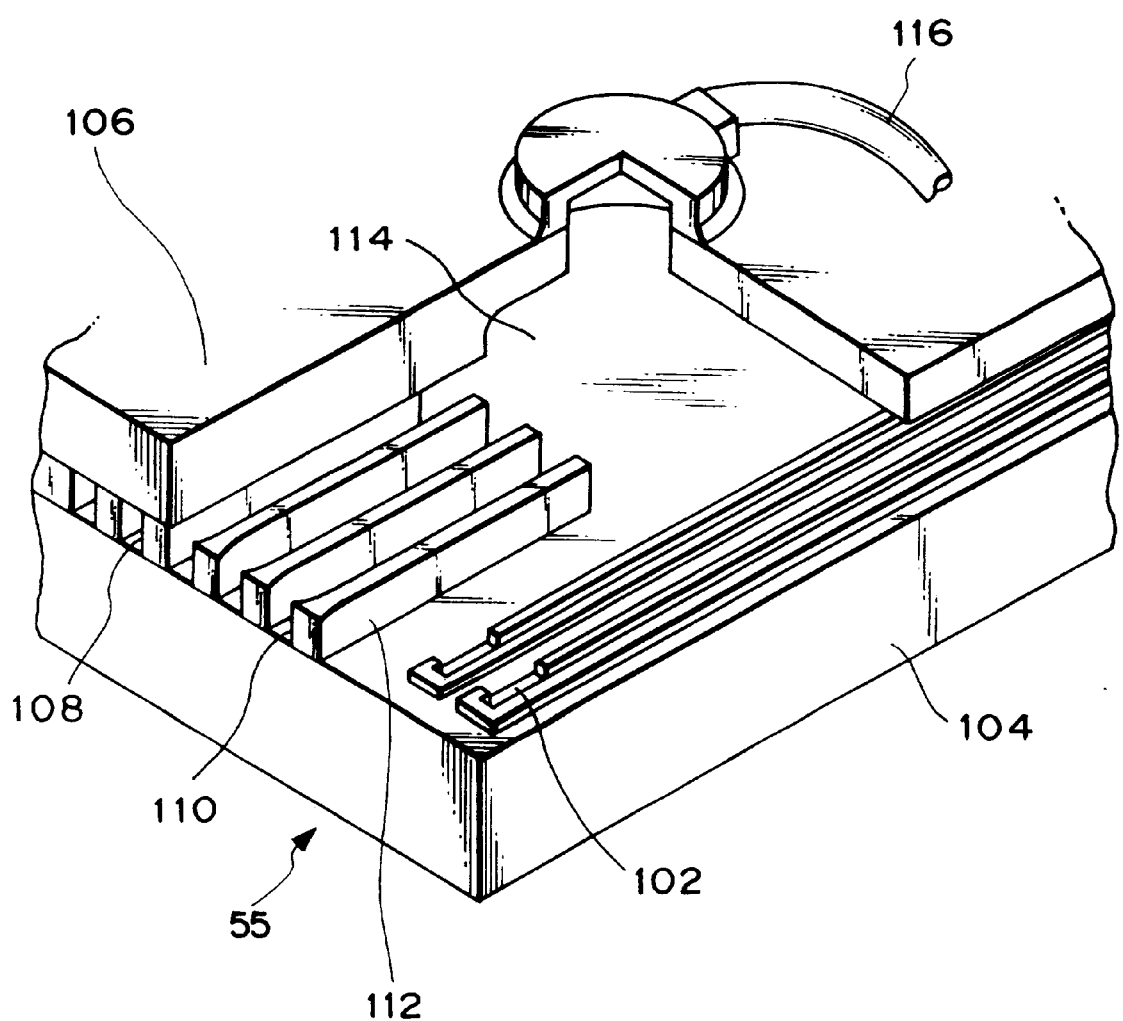
FIG. 3 is a perspective view showing a structure of an ink-jet head used in the color-filter manufacturing apparatus.

FIG. 3 is a perspective view showing the structure of the ink-jet head 55 used in the color-filter manufacturing apparatus 90. In FIG. 1, three ink-jet heads 55 are provided corresponding to R, G and B three colors. As these ink-jet heads 55 have the same structure, FIG. 3 only shows one of these ink-jet heads.

In FIG. 3, the ink-jet head 55 has a heater board 104, as a substrate on which a plurality of heaters 102 for heating ink are formed, and a top plate 106 to be placed on the heater board 104. A plurality of discharge orifices 108 are formed on top plate 106, and the discharge orifices 108 are connected to ink channels 110. The respective ink channels 110 are separated from each other by partition walls 112. The ink channels 110 are commonly connected at their rear ends to a single ink chamber 114, to which ink is supplied via an ink-supply orifice 116. The ink is supplied from the ink chamber 114 to the respective ink channels 110.

As shown in FIG. 3, the heater board 104 and the top plate 106 are aligned and assembled such that the respective heaters 102 are positioned corresponding to the respective ink channels 110. Although FIG. 3 shows only two heaters 102, the heaters 102 one-to-one correspond to the ink channels 110. In the state as shown in FIG. 3, when a predetermined drive pulse is supplied to the heaters 102, the ink on the heaters 102 is boiled to form bubbles, then the expansion of the bubbles pushes the ink from the discharge orifices 108, thus discharging the ink. It is possible to control the drive pulse to be applied to the heaters 102 by, e.g., controlling electric power, so as to adjust the size of bubbles, more specifically to freely control the volume of ink discharged from the discharge orifices.

FIGS. 4A to 4F are explanatory views showing an example of color-filter manufacturing process. Next, the manufacture of the color filter 54 will be described with reference to FIGS. 4A to 4F.

In this embodiment, a glass substrate is usually employed as the substrate 1, however, the substrate is not limited to glass, but any material can be used so far as it has necessary characteristics of a liquid-crystal color filter, such as transparency and mechanical strength.

FIG. 4A shows the glass substrate 1 having a black matrix 2 constituting light-emitting portions 9 and light-shielding portions 10. First, resin material is applied onto the substrate 1 having the black matrix 2. The resin material itself is poor in ink receptivity, but can be inkphiled on certain condition (s) (for example, light emission or combination of light emission and heating) and it has a characteristic of setting on certain condition(s). In accordance with necessity, prebaking is performed on the glass substrate 1 to form a resin layer 3 (FIG. 4B). The formation of the resin layer 3 is made by spin-coating, roll-coating, bar-coating, spray-coating, dip-coating or the like, and not limited to any particular method.

Next, the resin layer is partially inkphiled (FIG. 4C) by performing pattern-exposure on the resin layer on the light-transmitting portions 9 using a photomask 4, to form inkphiled portions 6 and uninkphiled portions 5 of the rein layer 3 (FIG. 4D).

Thereafter, respective R (red), G (green) and B (blue) ink are discharged onto the resin layer 3, in accordance with an ink-jet method, to color the layer in one ink-discharge process (FIG. 4E), and in accordance with necessity, the discharged ink is dried. The ink-jet method includes a method utilizing thermal-energy and a method utilizing mechanical-energy. Any of these methods can be preferably used. As ink to be used, any ink can be employed so far as it can be used for ink-jet printing. Coloring material of ink can be appropriately selected from various dyes or pigments in correspondence with transmission spectrum required for each of R, G and B pixels.

Next, the resin layer 3, colored and then light-emitted or light-emitted and heated, is set, and in accordance with necessity, a protective layer 8 is formed (FIG. 4F). This setting of the resin layer 3 is made by light emission or combination of light emission and heating, on condition(s) different from that of inkphiling of the resin layer, e.g., increased light exposure or heating at higher temperature.

FIGS. 5A to 5F are explanatory views showing another example of color-filter manufacturing process.

Figure 5A:
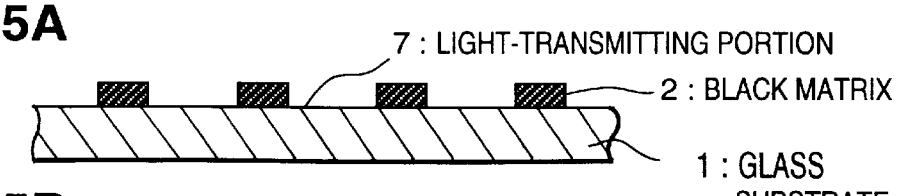
FIGS. 5A to 5F are explanatory views showing another example of color-filter manufacturing process.
Figure 5B:
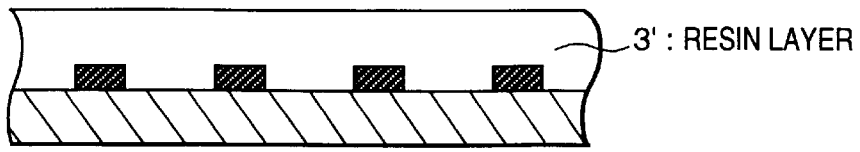

FIG. 5A shows the glass substrate 1 having light-transmitting portions 7 and the black matrix 2 as light-shielding portion. First, resin material, which can be set by light emission or combination of light emission and heating, and which has ink receptivity, is applied onto the substrate 1 on which the black matrix 2 is formed. In accordance with necessity, pre-baking is performed, and a resin layer 3' is formed (FIG. 5B). The formation of the resin layer 3' can be made by spin-coating, roll-coating, bar-coating, spray-coating, dip-coating or the like, and not limited to any particular method.

Figure 5C:
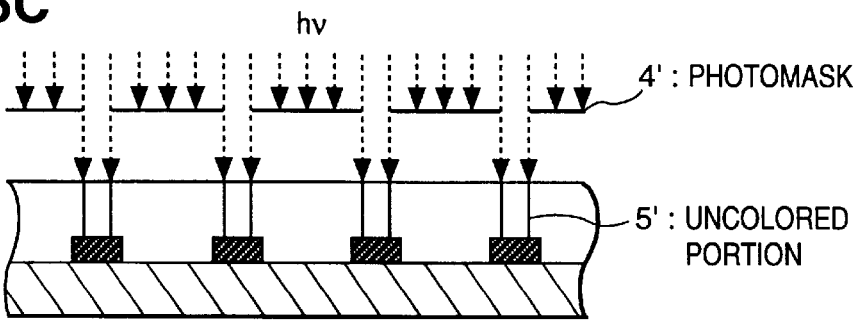
Figure 5D:
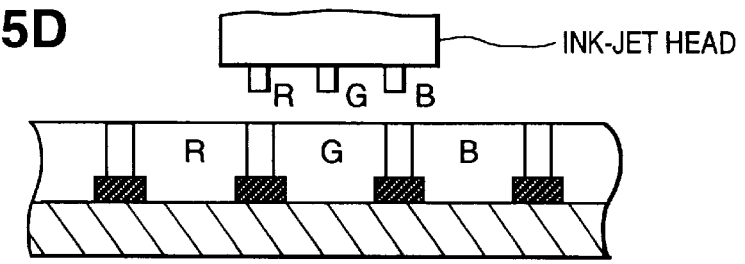
Figure 5E:
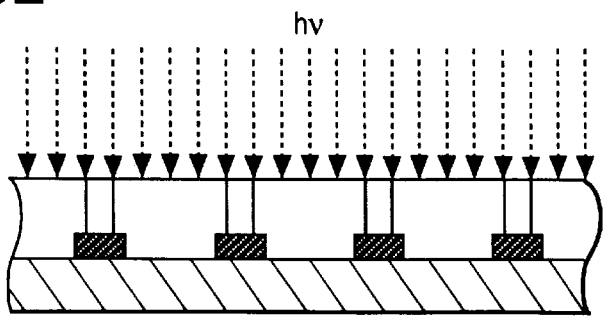

Next, the part of the resin layer not covering the light-shielding black matrix 2 is masked with a photomask 4', and pattern-exposure is performed to set the other parts of the resin layer, to form uncolored portions 5' which are not ink-receptive (FIG. 5C). Thereafter, the coloring of R, G and B is made in one ink-discharge process by using the ink-jet head (FIG. 5D), and in accordance with necessity, the ink is dried.

As the photomask 4' used for pattern-exposure is a mask having an opening to set the portions light-shielded by the black matrix 2. To prevent occurrence of uncolored portion in contact with the black matrix, relatively large amount of ink must be applied. For this purpose, the opening of the mask is preferably smaller than the width (light-shielding width) of the black matrix 2.

As the ink for coloring, both coloring matters and pigments can be used, further, both liquid ink and solid ink can be used.

As settable resin material, any resin material can be used so far as it has ink receptivity and it can be set by at least light emission or heating or combination thereof. For example, resin such as acrylic resin, epoxy resin, silicon resin, cellulose derivatives or denatured materials such as hydroxypropylcellulose, hydroxyethylcellulose, methylcellulose and carboxymethylcellulose, can be used.

Photo initiator (crosslinking agent) can be employed to promote crosslinking reaction of the resin by light or light and heat. As photo initiator, bichromate, bisazide, radical initiators, cationic initiators, anionic initiators and the like can be used. Further, these photo initiators can be mixed or combined with other sensitizers. Furthermore, photooxide generator such as onium salt can be added as crosslinking agent. Note that to further promote crosslinking reaction, thermal processing can be performed after light emission.

A resin layer containing the materials as mentioned above is excellent in thermal resistance and water resistance, and is fully resistible to high-temperature process or cleaning process in postprocessing.

As the ink-jet method used in this embodiment, a bubble-jet type method using electrothermal transducers as energy generators, or piezo-jet type method using piezoelectric devices can be employed. The coloring area and coloring pattern can be arbitrarily set.

The present embodiment shows an example where a black matrix is formed on a substrate, however, the black matrix may be formed after a settable resin layer has been formed or after the resin has been colored. The formation of black matrix is preferably made by: forming a metal thin film by sputtering or vapor deposition; and patterning by a photo-lithography process. Note that any other method can be used to form the black matrix.

Figure 5F:
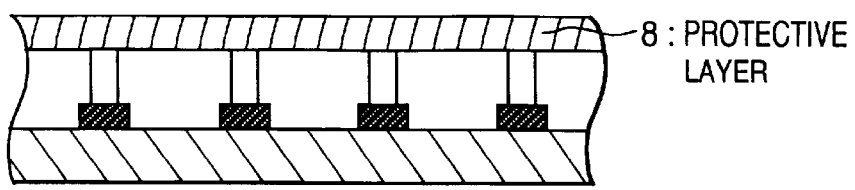

Next, only light emission or only heating, or the combination thereof is used to set the settable resin material (FIG. 5E), and in accordance with necessity, the protective layer 8 is formed (FIG. 5F). Note that in FIGS. 5c and 5E, symbol hv represents light intensity. In case of heating process, heat is applied instead of light hv. As the protective layer 8, a second resin material of photo-setting type, thermosetting type or photo- and thermo-setting type is used. Otherwise, inorganic materials can be used for forming the protective layer 8 by sputtering or vapor deposition. Any material can be used to form the protective layer 8 so far as it has transparency as a color filter and sufficient resistance in subsequent ITO (Indium Tin Oxide) forming process, orientation film forming process and the like.

FIGS. 6 and 7 are cross-sectional views showing the basic structure of a color LCD (Liquid Crystal Display) device 30 in which the above color filter is integrated.

The color LCD device 30 is constructed by assembling the color filter substrate 1 and an opposing substrate 21 and injecting liquid-crystal compound 18 between the substrates 1 and 21. A TFTs (Thin Film Transistors) (not shown) and a transparent pixel electrodes 20 are formed in matrix on the inner surface of the substrate 21. A color filter 54 is provided on the inner surface of the substrate 1, so that RGB color materials are arranged at positions respectively corresponding to the pixel electrodes 20. A transparent electrode (common electrode) 16 opposing to the pixel electrodes 20 is formed on all of the upper surface of the color filter 54. Usually, the black matrix 2 is formed on the color-filter substrate 1 side (see FIG. 6), however, in case of a BM (Black Matrix) on-array type liquid crystal panel, the black matrix 2 is formed on the opposing TFT substrate 21 side (see FIG. 7). Further, orientation films 19 are formed within the surfaces of both substrates. Liquid crystal molecules can be oriented in a specific direction by rubbing processing the orientation films 19. Polarizing plates 11 and 22 are attached to the outside of the respective glass substrates. The liquid-crystal compound 18 is filled in the gap (about 2 to 5 μm) between the glass substrates.

As a backlight, the combination of a fluorescent light (not shown) and a scattering plate (not shown) is generally used. Display is made by using the liquid-crystal compound 18 as an optical shutter to change transmittance of the backlight.

Next, application of this LCD device to an information processing apparatus will be described with reference to FIGS. 8 to 10.

Figure 8:
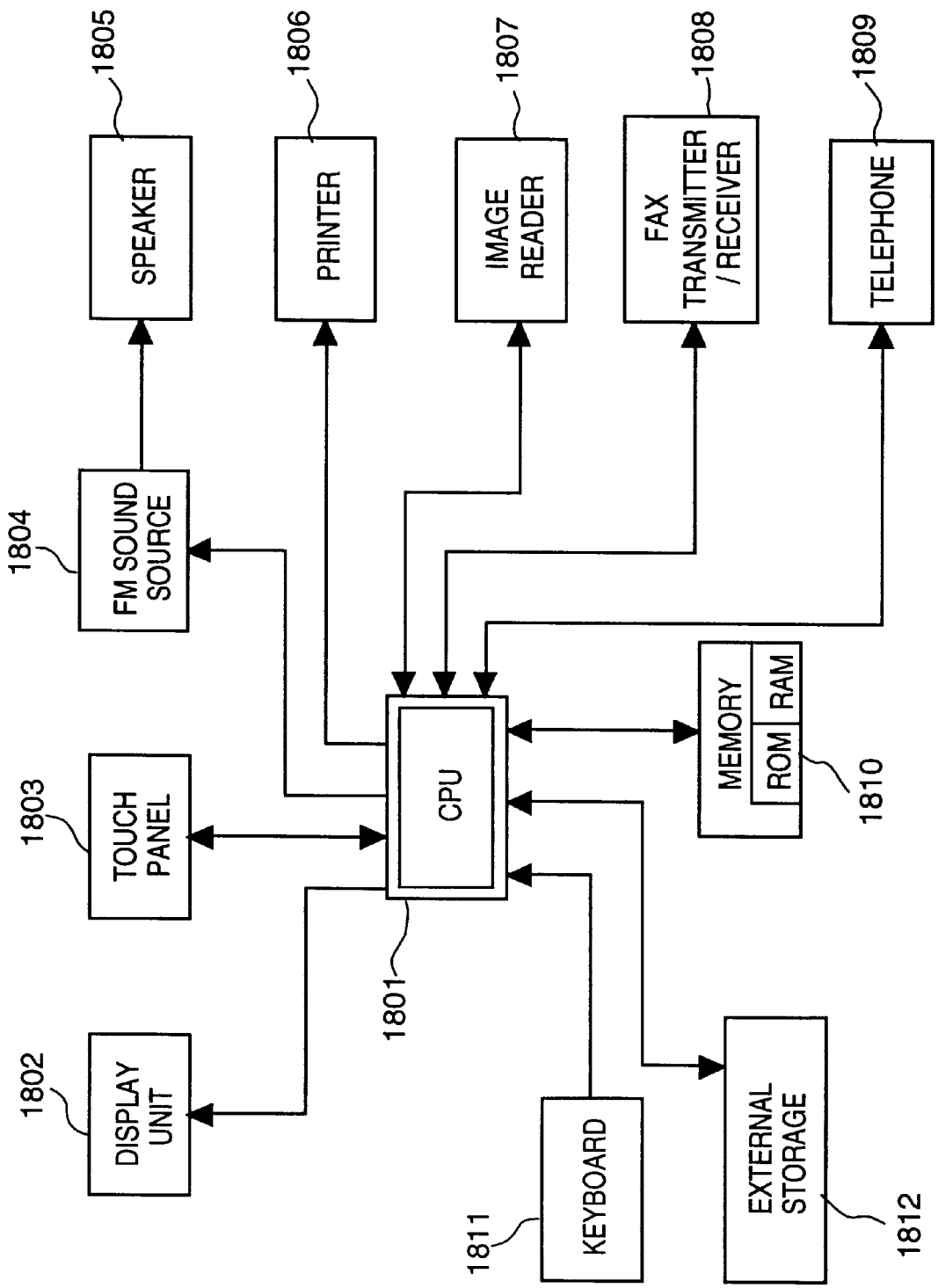
FIG. 8 is a block diagram showing a construction of an information processing apparatus using the LCD device.

FIG. 8 is a block diagram showing a construction of an information processing apparatus using the LCD device. The information processing apparatus functions as a word processor, a personal computer, a facsimile apparatus, and a copying machine.

In FIG. 8, numeral 1801 denotes a controller which controls the overall apparatus. It comprises a CPU such as a microprocessor and various I/O ports, and it outputs control signals, data signals and the like to the respective elements, and inputs control signals and data signals from the respective elements for performing control. Numeral 1802 denotes a display unit which displays data such as various menus, document information, image data read by a image reader 1807, on a display screen. Numeral 1803 denotes a transparent pressure-sensitive type touch panel, provided on the display unit 1802. By pressing the surface of the touch panel 1803 with a finger or the like, an item, a coordinate position and the like can be inputted on the display unit 1802.

Numeral 1804 denotes an FM (Frequency Modulation) sound source which accesses music information, generated by a music editor or the like and pre-stored in a memory 1810 or an external storage 1812 in the form of digital information, and performs frequency modulation on the read data. The electric signal from the FM sound source 1804 is converted into audio sound by a speaker 1805. A printer 1806 is used as an output terminal of a word processor, personal computer, facsimile apparatus or copying machine.

The image reader 1807 photoelectrically reads an original and inputs the read data. The image reader 1807 is provided in the middle of original-conveying path for reading originals for facsimile transmission or copying or other various originals.

Numeral 1808 denotes a facsimile (FAX) transmitter/receiver which performs facsimile transmission of original data, read by the image reader 1807, and receives facsimile signals and decodes the received facsimile signals. The FAX transmitter/receiver 1808 has an interface function between the information processing apparatus and an external device.

Numeral 1809 denotes a telephone having various telephone functions such as ordinary telephone function, answering function and the like.

The memory 1810 includes a ROM for storing programs such as system programs, manager programs and the other application programs, character fonts, dictionaries and the like, and a RAM for storing application programs loaded from the external storage 1812, document information, video information and the like.

Numeral 1811 denotes a keyboard for inputting document information, various commands and the like.

The external storage 1812 comprises storage media such as a floppy disk and a hard disk, for storing document information, music or audio information, user's application programs and the like.

Figure 9:
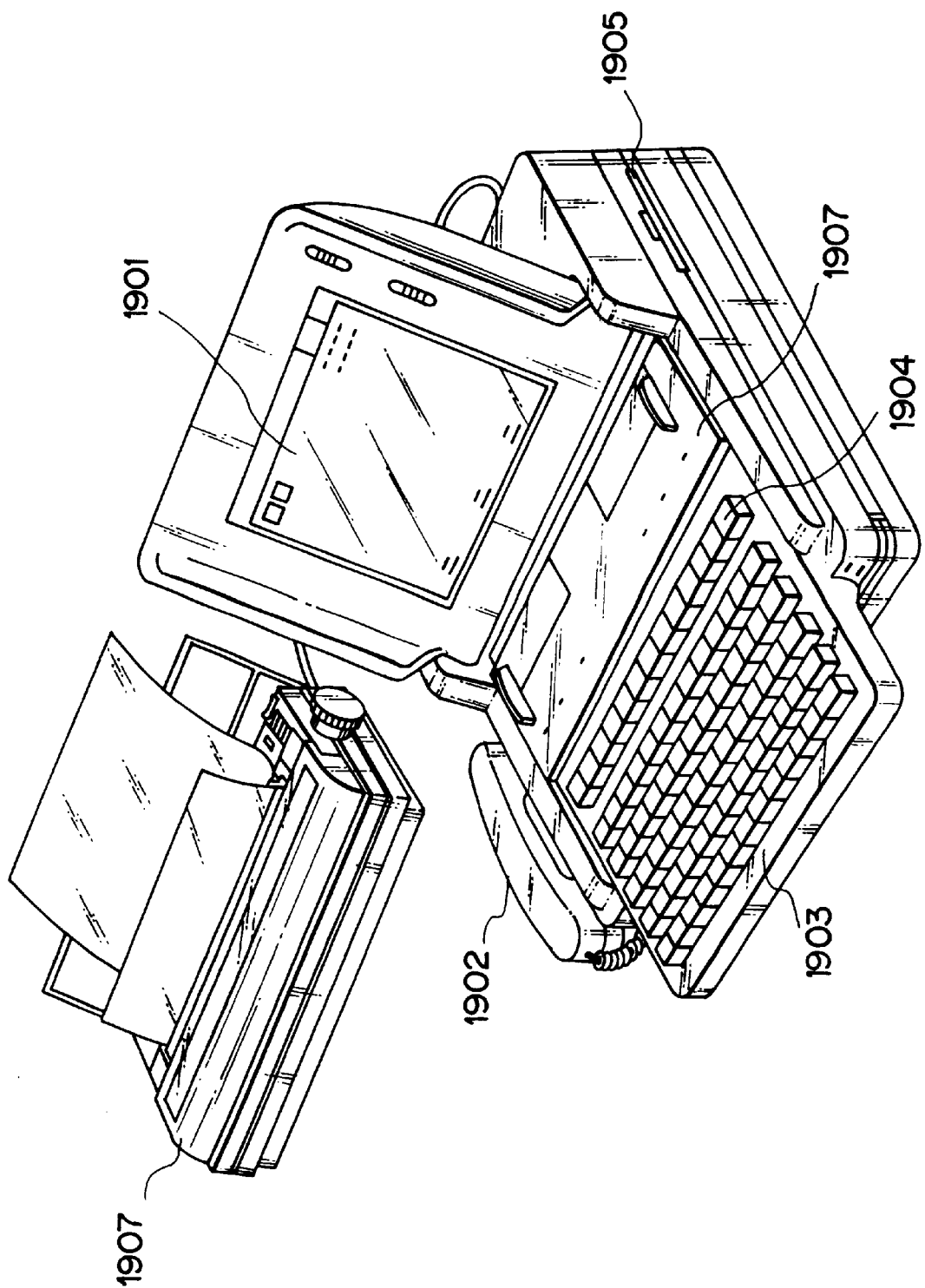
FIGS. 9 and 10 are perspective views respectively showing the information processing apparatus using the LCD device.

FIG. 9 is a perspective view respectively showing the information processing apparatus having the construction in FIG. 8.

In FIG. 9, numeral 1901 denotes a flat-panel display utilizing the above-described LCD device, for displaying various menus, figure information, document information and the like. On the display 1901, the touch panel 1803 is used for inputting coordinates and designating items by pressing its surface with a finger or the like. Numeral 1902 denotes a handset used when the apparatus functions as a telephone. A keyboard 1903 is detachably connected to the apparatus main body via a cord, for inputting various document functions and various data. The keyboard 1903 has function keys 1904 for various functions. Numeral 1905 denotes a slot for inserting a floppy disk for the external storage 1812.

Numeral 1906 denotes a paper feeder on which originals to be read by the image reader 1807 are set. The read originals are discharged from the rear portion of the apparatus. Upon facsimile reception and the like, read original data are print-outputted from an ink-jet printer 1907.

When this information processing apparatus functions as a personal computer or a word processor, various information inputted from the keyboard 1811 is respectively processed by the controller 1801 in accordance with a predetermined program, and outputted as an image from the printer 1806.

When the information processing apparatus functions as a receiver of a facsimile apparatus, facsimile information inputted from the FAX transmitter/receiver 1808 via a communication line is reception-processed by the controller 1801 in accordance with a predetermined program, and outputted as a received image from the printer 1806.

When the information processing apparatus functions as a copying machine, an original is read by the image reader 1807, and the read original data is outputted as a copied image from the printer 1806 via the controller 1801. Note that when the apparatus functions as the receiver of the facsimile apparatus, the original data read by the image reader 1807 is transmission-processed by the controller 1801 in accordance with a predetermined program, and transmitted onto the communication line via the FAX transmitter/receiver 1808.

Figure 10:
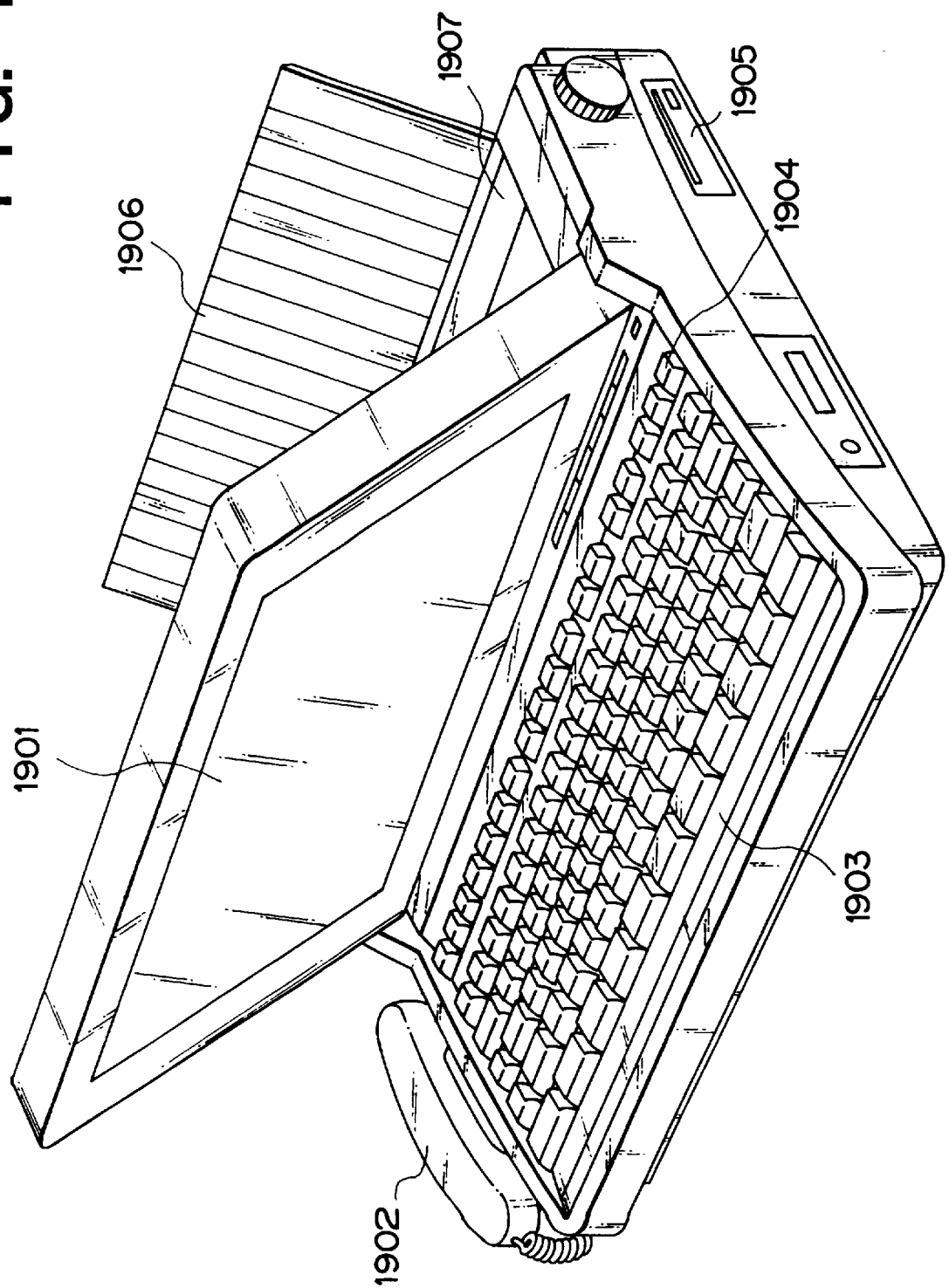

Note that the ink-jet printer can be integrated into the above information processing apparatus as shown in FIG. 10. This further improves portability. In FIG. 10, the elements having the same functions as those in FIG. 9 have the same reference numerals.

Next, the color-filter manufacturing process to which the manufacturing method of the present embodiment is applied will be described with reference to FIGS. 11A to 11E.

First, the glass substrate 53 is set on the XYθ stage 52 of the color-filter manufacturing apparatus 90. After appropriate positioning, a color-filter forming area (coloring area) of the glass substrate 53 is moved to a position directly below the ink-jet head 55, then coloring of the pixels of the color filter is performed.

FIGS. 11A to 11E show ink-discharge operation characteristic of the present embodiment. In this example, one pixel of the color filter is colored with a plurality of discharge ink. In these figures, at least ink I1 has already been discharged onto one pixel. At least a part of the already-applied ink I1 exists in liquid state before the ink I1 is completely absorbed into the resin layer 3 or completely dry, the next ink (I2) is discharged in the following manner, so that the next ink can mix with the already-applied ink within the same pixel area. This improves ink-application precision.

Figure 11:
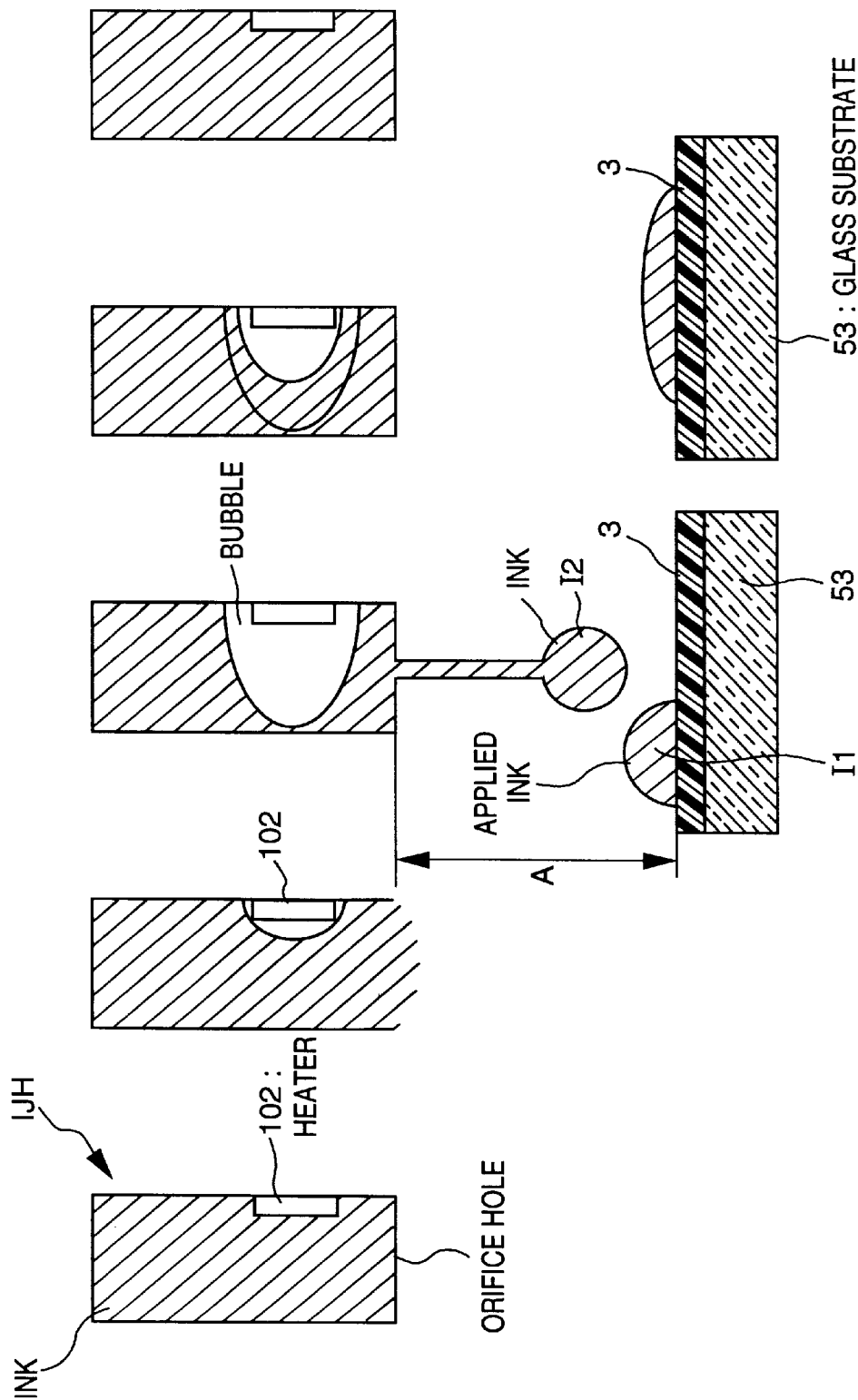
FIGS. 11A to 11E are explanatory views showing a color-filter manufacturing process to which a manufacturing method according to the embodiment is applied.
Figure 12:
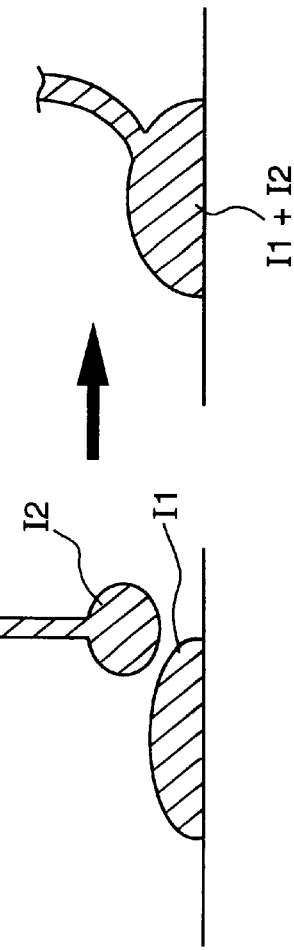
FIG. 12 is an explanatory view showing ink drawn by surface tension.

First, a drive pulse is supplied to the heater 102 from the state shown in FIG. 11A, then a bubble occurs around the heater 102 as shown in FIG. 11B. The bubble grows as shown in FIG. 11C, then the ink I2 is discharged from the discharge nozzle. At this time, as shown in FIG. 11C, the distance A between the surface of ink-jet head 55 and the surface of the glass substrate 53 is set to a minimum distance such that the ink I2 is not separated from the ink-jet head 55 in the form of ink droplet. That is, as shown in FIG. 11C, the ink I2 does not become an ink droplet but a pillar and is applied onto the glass substrate 53.

When the ink is separated from the discharge nozzle in the form of droplet, the variation of separating position of the ink cannot be prevented. Different from printing on print media such as print sheet, this causes a serious problem in coloring a color filter because it requires high precision in ink application to the pixels. However, in the present embodiment, ink arrives at a desired pixel in the form of pillar before it is separated from the discharge nozzle. This greatly improves ink-arrival precision.

Figure 13:
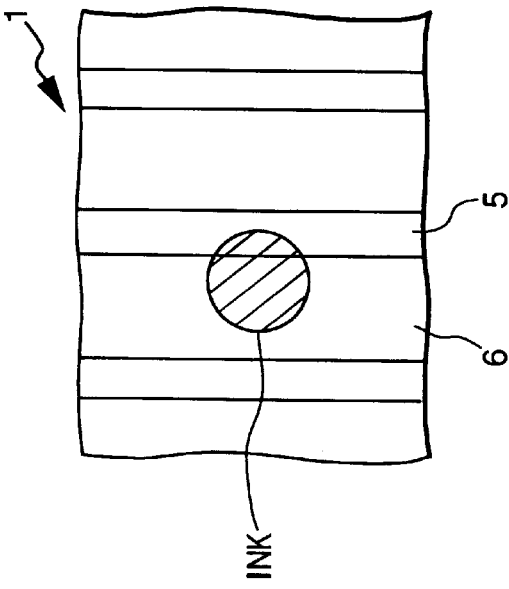
FIG. 13 is an explanatory view showing a shifted ink-discharge position.

Further, in the case where the ink is applied onto the glass substrate in the form of pillar, the ink I2 comes into contact with the ink I1 that has already been discharged and exists in liquid state, and they mix with each other by surface tension. More specifically, when the ink I2 mixes with the ink I1, the ink I2 is drawn toward the ink I1 by the surface tension of the ink I1. Even if the ink I2 has been shifted from its discharge direction and not discharged in an exact direction, before the ink I2 reaches the glass substrate 53, the discharge direction of the ink I2 is corrected toward the ink I1 by the surface tension of the ink I1. As a result, the ink-application precision of the ink I2 can be improved. As shown in FIG. 13, even if an ink-discharge position is shifted and the ink is applied onto the glass substrate 53 at a part which slightly includes the uninkphiled portion 5, the currently-applied ink mixes with previously-applied ink, and as the currently-applied ink is drawn by the previously-applied ink, the currently-applied ink returns to a desired position within a pixel (the inkphiled portion 6).

Further, as ink is applied to a pixel in the form of pillar, the peripheral pixels are not spattered with the ink. As occurrence of undesirable minute ink droplets other than the ink to be applied to the pixel can be prevented, the problem that the other pixels might be spotted with the slight ink droplets can be reduced. Actually, in the experiments by the present applicant, it has been confirmed that the application of ink in the form of pillar reduces spots on pixels other than a target pixel.

Figure 14:
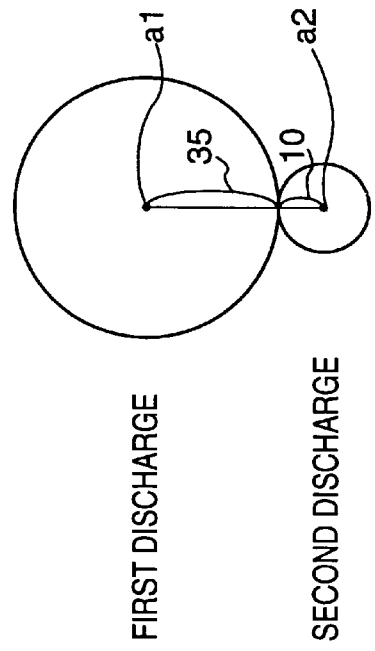
FIG. 14 is an explanatory view showing an example of ink discharge.

As an ink-discharge example, in FIG. 14, the initially-applied ink I1 spreads to have a diameter of about 70 $\mu$m immediately after it has been applied onto the glass substrate. If the distance between a central point a1 of the ink I1 and a central point a2 of the ink I2 is 45 $\mu$m or less, or more preferably 20 to 30 $\mu$m, the ink I1 and the ink I2 mix with each other by surface tension. Note that the ink used in this example is in liquid state at 5° C., however, solid ink can be used so far as it spreads immediately after it has applied onto the substrate.

Figure 15B:
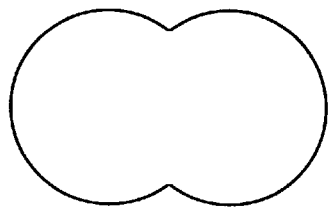
FIGS. 15A and 15B are explanatory views showing coloring state where ink is discharged after previously-discharged ink has dried.
Figure 16B:
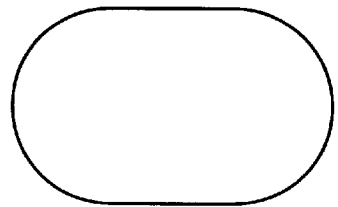
FIGS. 16A and 16B are explanatory views showing coloring state where ink is discharged before previously-discharged ink has dried.
Figure 15A:
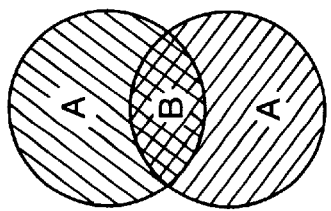
Figure 16A:
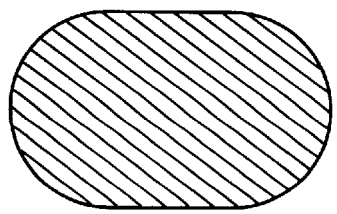

Next, the advantage in the above case where the mixture of the ink I2 with the previously-applied ink I1 in liquid state will be described. That is, as shown in FIG. 15A, if the ink I2 is discharged after the initial ink I1 has completely absorbed into the resin layer 3 or completely dried, the color of an ink-overlap portion B is deeper than that of a portion A, thus causing density unevenness. Further, the colored portion after the ink has dried is gourd-shaped as shown in FIG. 15B, which may cause uncolored portion(s). On the other hand, if the ink I2 is mixed with the ink I1 while at least a part of the ink I1 is in liquid state, the pixel can be colored with an even density as shown in FIG. 16A. Also, the shape of the colored portion after the ink has dried is oblong as shown in FIG. 16B, which prevents occurrence of uncolored portion(s).

Figure 17A:
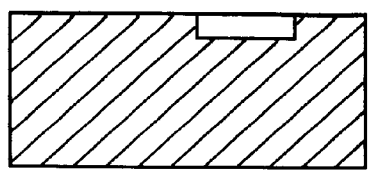
FIGS. 17A to 17E are explanatory views showing discharging of ink in the form of droplet.
Figure 17B:
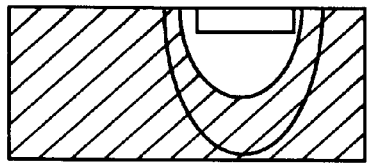
Figure 17C:
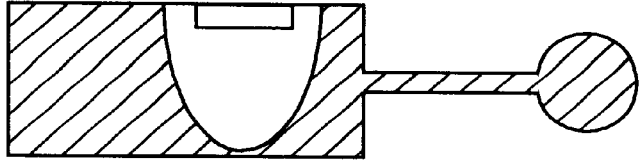
Figure 17D:
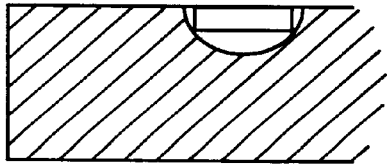
Figure 17E:
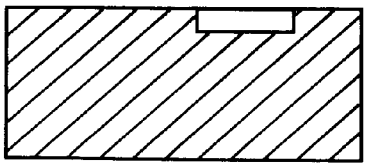

Note that in the conventional printers, a drawing object is flexible material such as paper, the ink-jet head cannot be moved close to the drawing objects within a certain range due to wrinkles and/or waving of the drawing object. Generally, it is required to maintain the interval between the drawing object and the ink-jet head about 0.9 to 1.5 mm. To stabilize ink discharge in such distance, the ink discharge must be made at a predetermined speed (normally 10 m/s) or higher. Thus, if ink is discharged at a relatively high speed in the state where the ink-jet head and the drawing object are away from each other by a predetermined distance, the discharged ink becomes a plurality of ink droplets as shown in FIGS. 17A and 17B. The scattered ink droplets are not discharged in uniform directions, which degrades ink-arrival precision. Further, as ink-discharge speeds of the respective ink droplets are different, when coloring is performed while the ink-jet head IJH is scanned with respect to the glass substrate 53, ink-arrival positions of the respective ink droplets are shifted. On the other hand, in the present embodiment, the drawing object is fixed-shaped material with a smooth surface such as glass substrate, the distance between the ink-jet head IJH and the surface of the glass substrate 53 can be reduced. This enables application of ink not in the form of ink droplet but in the form of pillar, onto the glass substrate 53, as shown in FIGS. 17C to 17E. Note that the smoothness (roughness) of the glass substrate to obtain the advantage of the present embodiment is set such that the distance from peaks to valleys in irregularities of the glass substrate surface is about 25 $\mu$m, or more preferably 20 $\mu$m or less.

Figure 19:
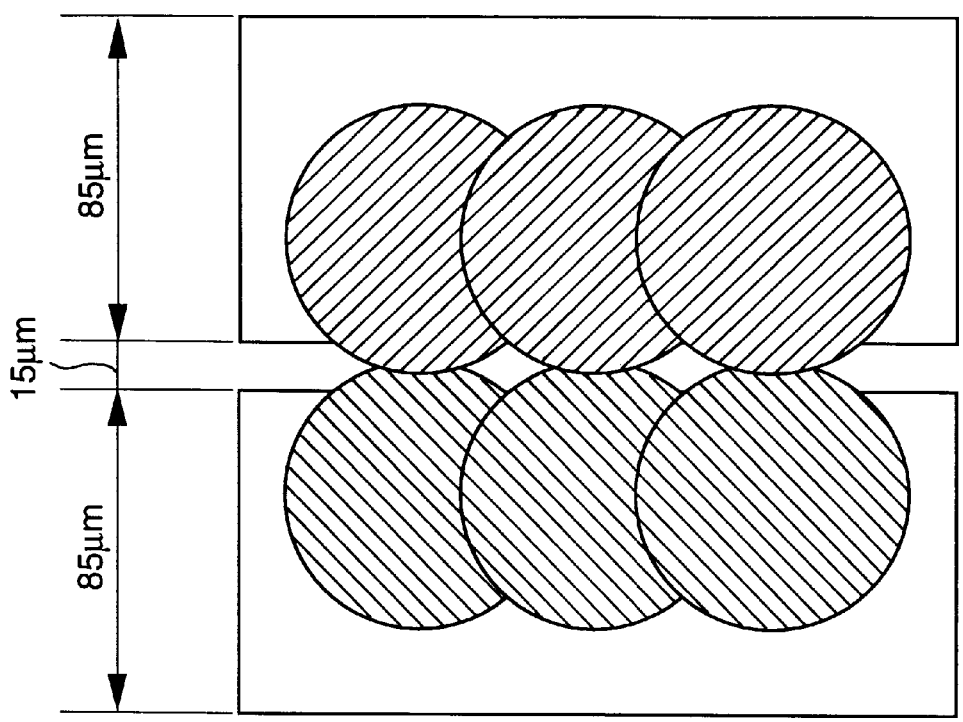
FIG. 19 is an explanatory view showing a state where a plurality of ink are arrived shifted from respective pixels.
Figure 18:
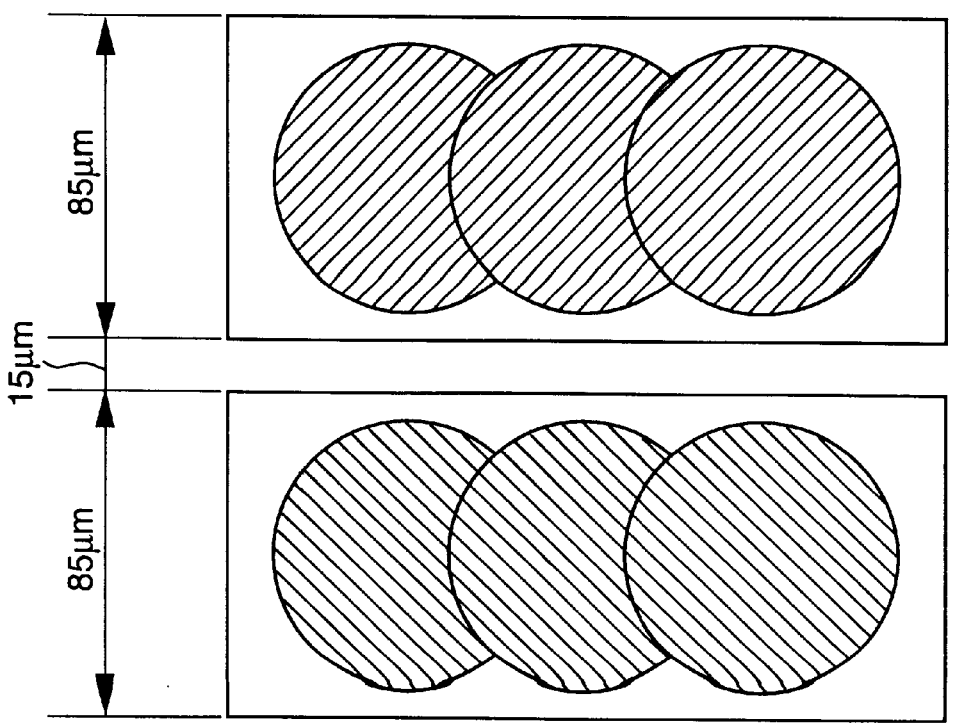
FIG. 18 is an explanatory view showing a state where a plurality of ink are exactly arrived at respective pixels.

As shown in FIG. 18, very high precision is required in the color filter, and as shown in FIG. 19, even lateral 10 $\mu$m shift of ink-arrival position causes color mixture or uncolored portion(s), resulting in a poor product. In on-demand type ink-jet method, the color-filter manufacture method is impossible in principle if it has a problem of degradation of ink-arrival precision, accordingly, to improve ink-arrival precision by using the ink-discharge method as in the present embodiment is very significant.

Note that in the above description, ink is discharged successively in the scanning direction of the ink-jet head, however, it can be arranged such that ink is applied to every other pixel in the first scanning, and in the second scanning, the ink is applied so as to fill gaps between the ink-applied pixels, while the initially-applied ink is in liquid state.

Next, a method for observing ink discharge from the ink-jet head will be described with reference to FIGS. 20 and 21.

Figure 20:
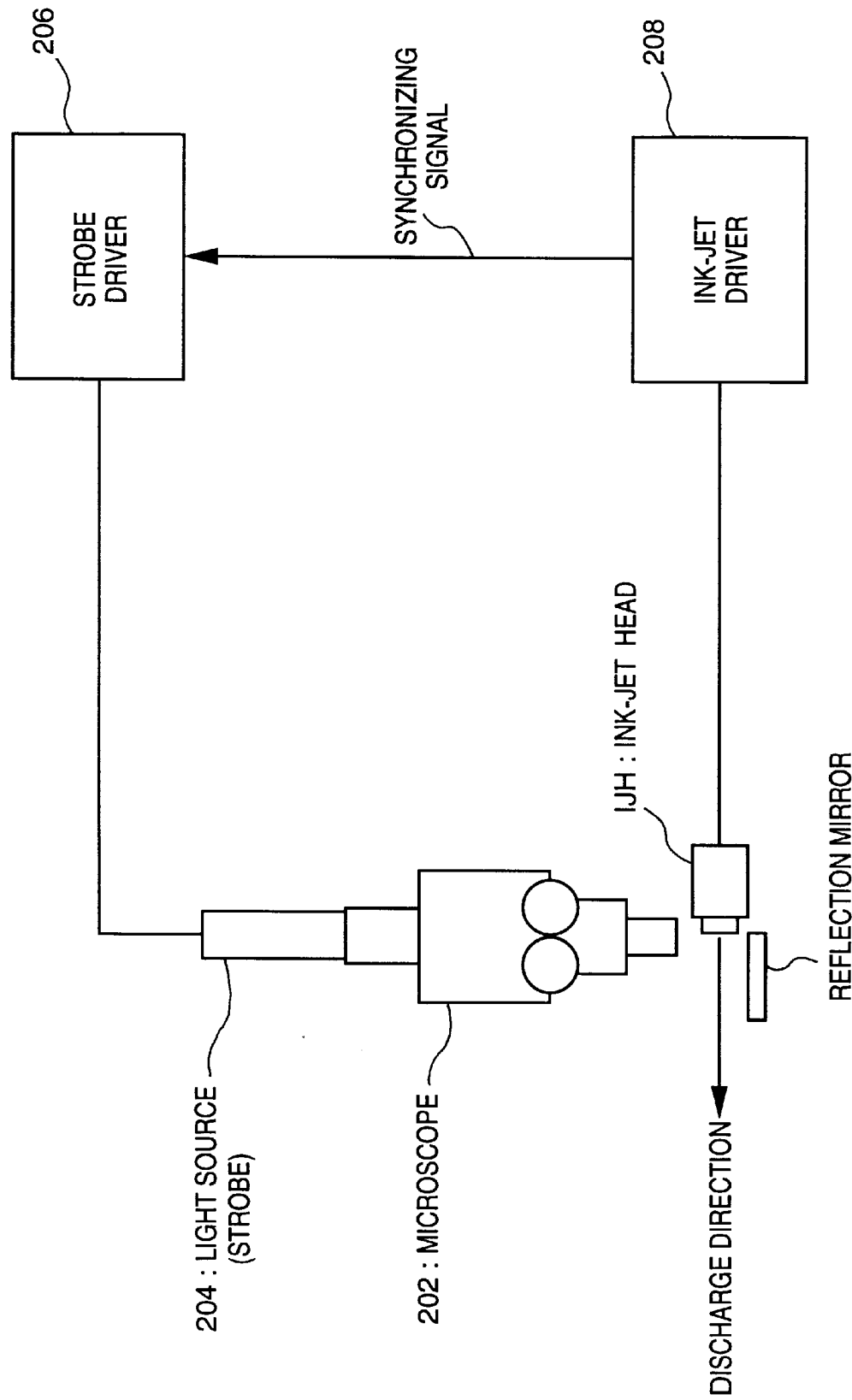
FIG. 20 is a block diagram showing a construction of an apparatus for observing ink-discharge status.
Figure 21:
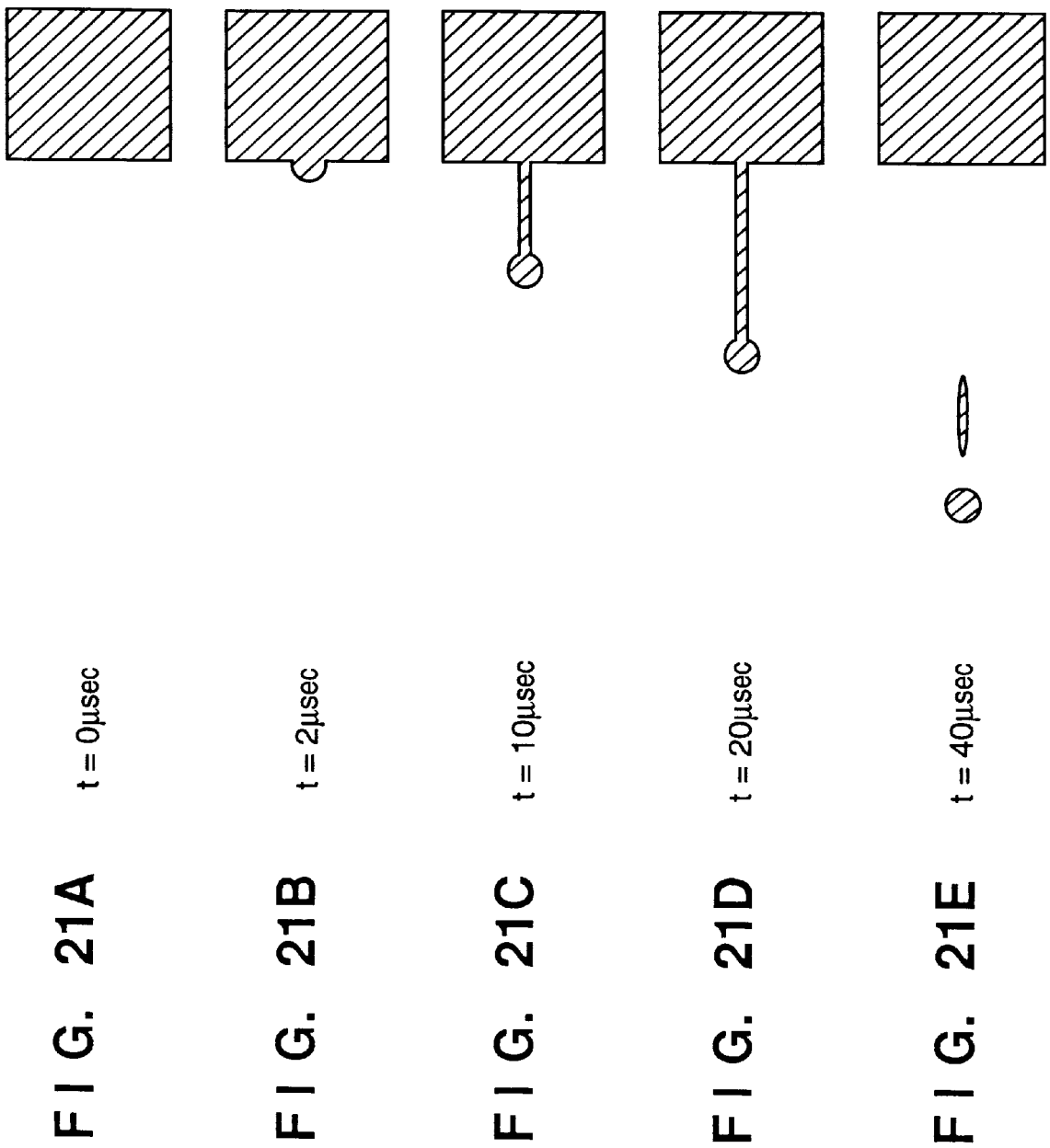
FIGS. 21A to 21E are explanatory views showing the observation of ink-discharge process.

As shown in FIG. 20, the ink discharge is observed by using a microscope 202. The microscope 202 has a strobe 204 as a light source for observation. A driver 206 for the strobe 204 has a synchronizing circuit which inputs an external signal and drive the strobe 204 to emit light in synchronization with the external signal, and a delay circuit for shifting light emission timing from the timing of the external signal. In this ink-discharge observation, an ink-jet head drive signal from an ink-jet driver 208 is used as the external signal.

In this apparatus for observing ink discharge, an ink-jet head IJH is fixed to the microscope 202 so that the ink-discharge direction of the ink-jet head IJH corresponds with an observation surface. This enables time-sequential observation of ink discharge in accordance with a drive signal to the ink-jet head IJH.

FIGS. 21A to 21E are explanatory views showing the ink discharging process. First, as strobe delay time is set to 0 $\mu$m and the strobe emits light in complete synchronization with the ink-jet head drive signal, it is found that the ink has not been discharged yet. Next, as the strobe delay time is set to 2 µm, it is found that the ink is just being discharged. As the strobe delay time is set to 10 µm, it is found that the ink is in the form of pillar. As the strobe delay time is increased, it can be observed that the ink state changes from the pillar into droplets.

Thus, the ink state can be easily observed by setting the strobe light emission to be synchronized with the ink-jet head drive signal.

Next, the ink-discharge speed and the distance between the ink-jet head and the glass substrate will be described below.

As to the ink-discharge speed, if it is too fast, problems such as sputtering might occur, but if it is too slow, ink discharge becomes unstable and discharged ink might shifted, which degrades ink-arrival precision. That is, a preferable ink-discharge speed is 5 m/s to 20 m/s.

Figure 23:
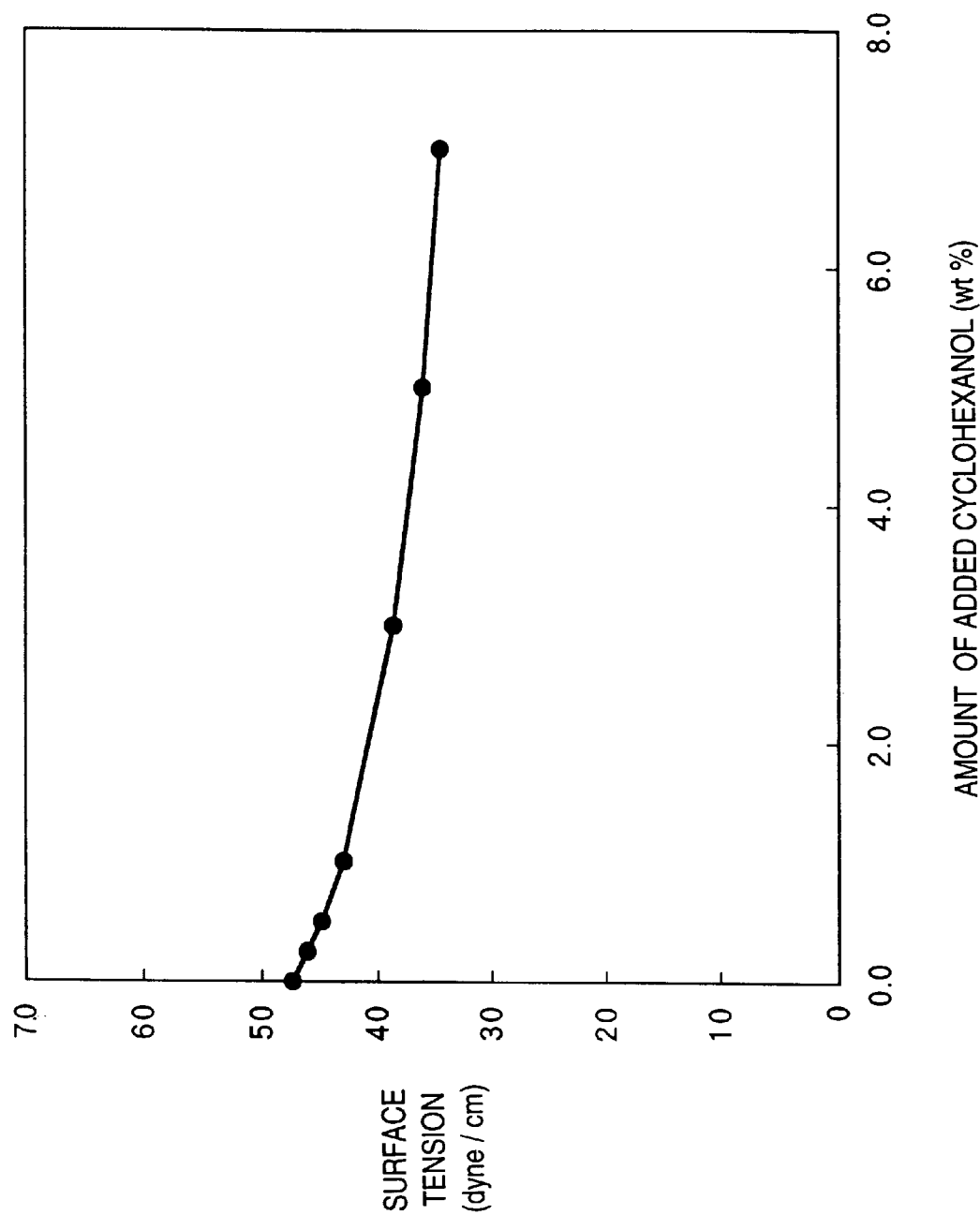
FIG. 23 is a line graph showing the relation between the content of cyclohexanol and surface tension.
Figure 24:
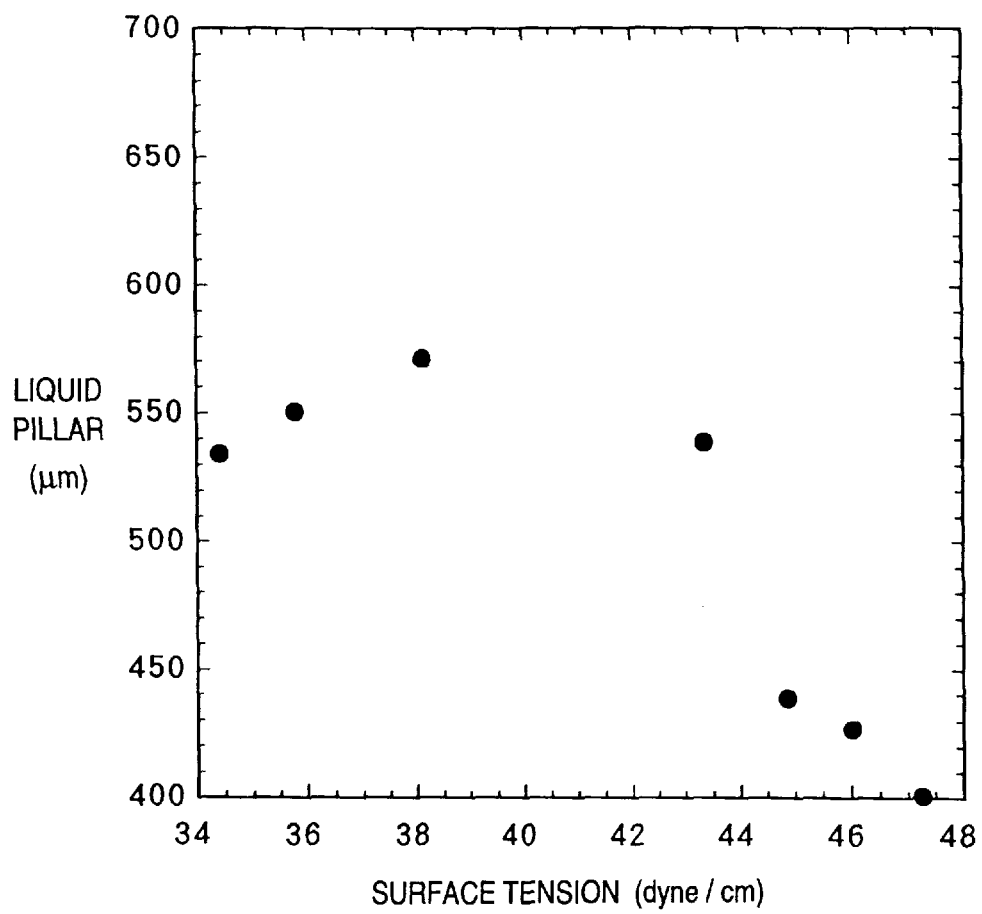
FIG. 24 is a graph showing the relation between surface tension and ink-pillar length in a case where an ink-discharge amount is 80 ng.

Further, as to the distance between the ink-jet head IJH and the glass substrate 53, although it depends on surface tension and discharge amount of ink, a preferable distance is 0.9 mm or less, or more preferably 0.05 to 0.5 mm, or further preferably 0.05 to 0.2 mm. FIG. 22 shows the relation among the composition, the surface tension and the length of ink pillar. The level of surface tension of ink mainly depends on the content of cyclohexanol. FIG. 23 shows the relation between the content of cyclohexanol and surface tension. FIG. 24 shows the relation between the surface tension when the ink-discharge amount is 80 ng and the length of ink pillar when the ink is discharged. As the surface tension is smaller, the length of ink pillar is longer.

Figure 25:
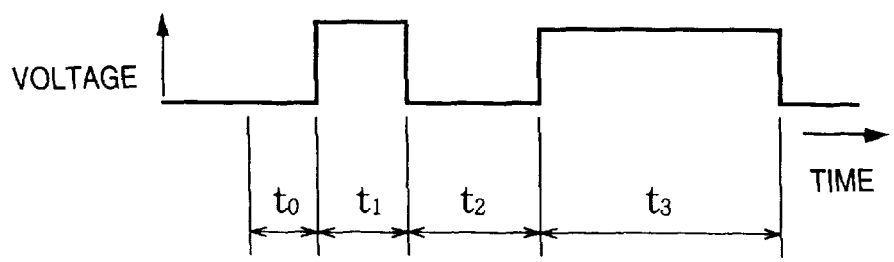
FIG. 25 is a timing chart showing an example of voltage pulse to be applied to heaters.

In actual experiment, ink discharge has been performed under the conditions that the distance between the surface of the ink-jet head IJH and the glass substrate 53 is 0.1 mm, and the discharge speed is 8 m/s. As ink-discharge condition, although it depends on nozzles to be used, a voltage pulse as shown in FIG. 25 is applied to the heaters 102. This pulse waveform has time intervals, approximately, t0=0 to 1.25 µsec, t1=0 to 1.5 µsec, t2=0 to 3 µsec, t3=1.0 to 3.0 µsec.

Figure 26A:
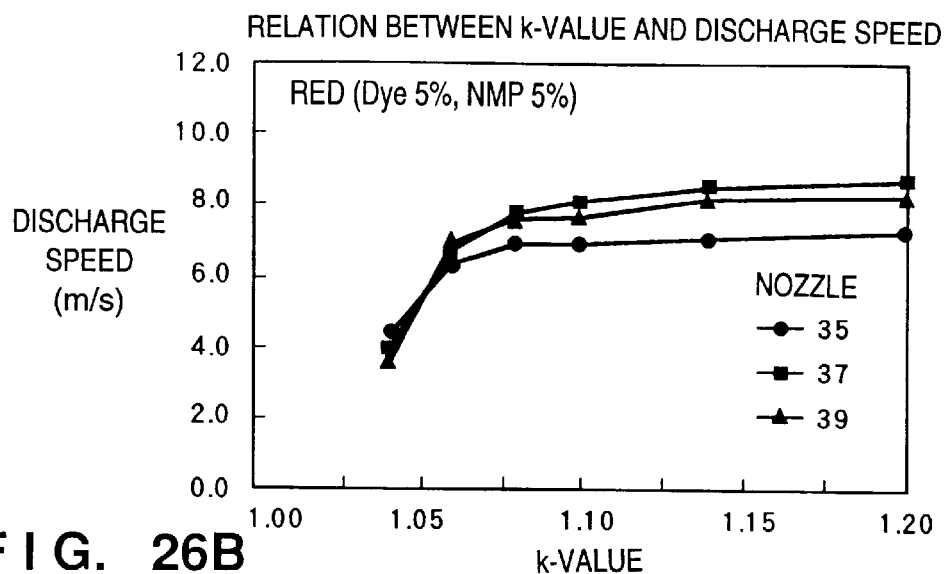
FIGS. 26A to 26C are line graphs showing the relation between a k-value practically indicative of ink-discharge power, and ink-discharge speed.
Figure 26B:
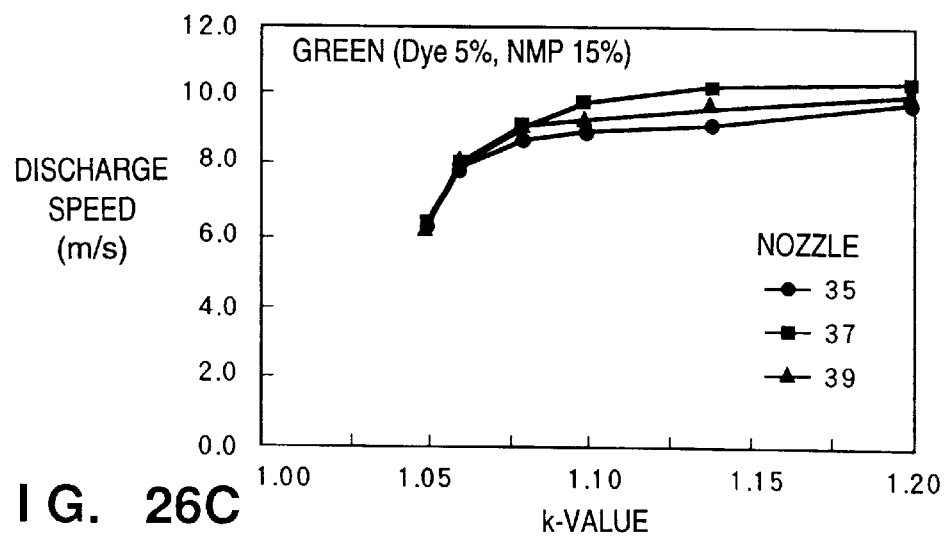
Figure 26C:
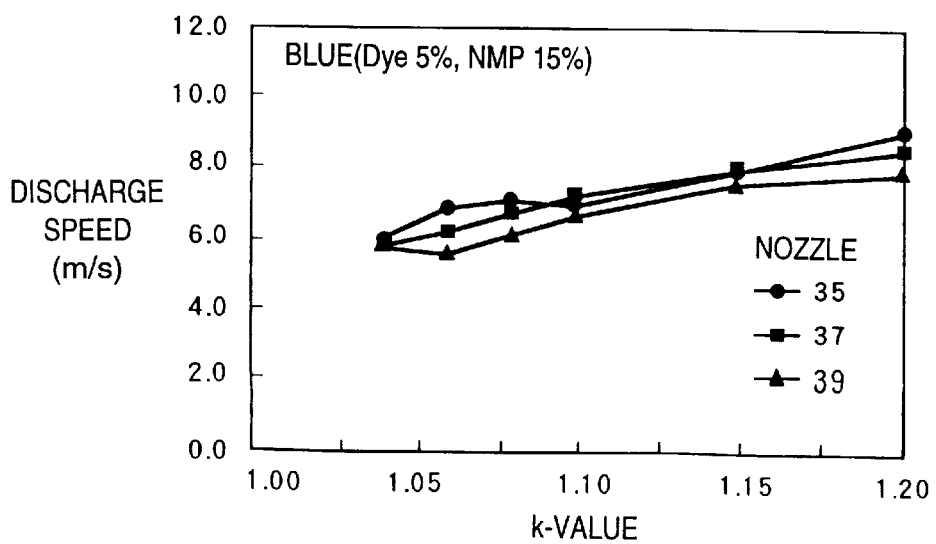

The ink-discharge speed can be controlled by changing the above voltage waveform. FIG. 26 shows the relation between a k-value which practically indicates the power to discharge ink and the ink-discharge speed. From this experimentally obtained relation between the k-value and the discharge speed, the pulse waveform of the voltage to be actually applied to the heaters 102 is set.

The above k-value can be obtained from the following equation,:

k-value=PWop/PWth

PWth: critical pulsewidth at the beginning of ink discharge on the assumption that a fixed predetermined voltage is applied PWop: pulsewidth upon actual ink discharge Next, ink to be used for coloring the color filter will be described.

FIG. 27 shows an example of the composition of ink available for color filters.

First, solvents as shown in FIG. 28 can be used. Among these solvents, more preferable solvents vapor upon heating of the heaters 102, at 250° C. or lower, or more preferably at 230° C. or lower. As the content in the ink, it is preferably 10 to 98 wt %, or more preferably 15 to 95 wt %.

As coloring material, dyes or pigments can be used. Dyes generally have good color characteristics, therefore color filters in clear colors can be obtained. However, in comparison with pigments, dyes are inferior in thermal resistance and photo resistance. As to molecular structure, azo dyes, phthalocyanine dyes, triphenylmethane dyes, xanthene dyes, anthraquinone dyes can be used. For ink having water as main solvent, dyes including two or more water-soluble group such as sulfonic acid group and carboxyl group in molecules are desirable from the point of solubility. For ink having non-water solvent (glycolether or the like), oleaginous dyes are desirable.

As pigments, organic pigments such as azo pigments and phthalocyanine pigments can be used. In comparison with dyes, the pigments are inferior in color characteristics (transmittance, chromaticness contrast and the like), however, the pigments are superior in thermal resistance and optical resistance. Upon practical use, the pigment is dispersed in an organic solvent using polymer compound or surfactant. After the dispersion, the particle diameter of the pigment is average 0.5 µm or less, or more preferably 0.2 µm or less.

Preferable content of both dye and pigment in ink is 1 to 15 wt %, or more preferably 3 to 10 wt %.

As additives, pH regulator, antifungal agent, anti corrosive, viscosity regulator, surfactant, ultraviolet absorbent, photostabilizer (singlet oxygen quencher), chelating agent or the like can be added to ink in accordance with necessity. The content of additive in ink is 0.01 to 5 wt %, or more preferably 0.1 to 2.5 wt %.

As described above, the present embodiment improves ink-arrival precision, and thus enables constant production of excellent color filters.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the print head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the print head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type print head having a length corresponding to the width of a maximum printing medium which can be printed by the printer, either the arrangement which satisfies the full-line length by combining a plurality of print heads as disclosed in the above specification or the arrangement as a single print head obtained by forming print heads integrally can be used.

In addition, an exchangeable chip type print head which can be electrically connected to the apparatus main unit and can receive an ink from the apparatus main unit upon being mounted on the apparatus main unit or a cartridge type print head in which an ink tank is integrally arranged on the print head itself can be applicable to the present invention.

It is preferable to add recovery means for the print head, preliminary auxiliary means, and the like provided as an arrangement of the printer of the present invention since the printing operation can be further stabilized. Examples of such means include, for the print head, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in each of the above-mentioned embodiments of the present invention, it is assumed that the ink is a liquid. Alternatively, the present invention may employ an ink which is solid at room temperature or less and softens or liquefies at room temperature, so far as the ink liquefies upon application of a use printing signal.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

As described above, the present invention can improve ink-arrival precision by applying ink not in the form of ink droplet but in the form of pillar, thus enables manufacture of color filters with high precision.

As many apparently widely different embodiments of the present invention can be made without departing from the spirit and scope thereof, it is to be understood that the invention is not limited to the specific embodiments thereof except as defined in the appended claims.

What is claimed is:

1. A color-filter manufacturing method for manufacturing a color filter by discharging ink from an ink-jet head onto a substrate so as to form a plurality of filter elements on the substrate, comprising the steps of:

providing the substrate;

discharging a first ink of a predetermined color from said ink-jet head, at a position for the filter elements on the substrate; and discharging a second ink of the predetermined color from said ink-jet head in a form having a front side and a rear side, and extending in a direction from said ink-jet head to the substrate, so that the front side of the ink arrives at the substrate before the rear side of the ink is separated from the ink-jet head, and mixes with the discharged first ink.

2. The color-filter manufacturing method according to claim 1, wherein in said step of discharging ink an interval between said ink-jet head and said substrate is set, and an ink discharge speed is set.

3. The color-filter manufacturing method according to claim 2, wherein said ink-jet head is a print head which discharges ink by utilizing thermal energy, and comprises thermal energy transducers for generating thermal energy to be applied to the ink, and in said step of discharging ink, said ink-jet head discharges ink at the set ink discharge speed by controlling a level of thermal energy generated by the thermal energy transducers.

4. A color-filter manufacturing apparatus for manufacturing a color filter by discharging ink from an ink-jet head onto a substrate so as to form a plurality of filter elements on the substrate, comprising:

means for arranging the substrate;

an ink-jet head for discharging ink onto said substrate; and a driver for driving said ink-jet head so as to discharge a first ink of a predetermined color at a position for the filter elements on the substrate, and to discharge a second ink of the predetermined color in a form having a front side and a rear side, and extending in a direction from said ink-jet head to the substrate, so that the front side of the ink arrives at the substrate before the rear side of the ink is separated from the ink-jet head, and mixes with the discharged first ink.

5. The color-filter manufacturing apparatus according to claim 4, wherein said ink-jet head is a print head which discharges ink by utilizing thermal energy, and includes thermal energy transducers for generating thermal energy to be applied to the ink, and said ink-jet head discharges ink at a set ink-discharge speed by controlling a level of thermal energy generated by the thermal energy transducers.

6. A color filter having a substrate and manufactured by discharging ink from an ink-jet head onto a substrate so as to form a plurality of filter elements on the substrate, wherein a first ink of a predetermined color is discharged from said ink-jet head at a position for the filter elements on the substrate, where a second ink of the predetermined color, that was ejected from said ink-jet head in a form having a front side and a rear side, and extending in a direction from said ink-jet head to the substrate so that the front side of the ink arrives at the substrate before the rear side of the ink is separated from the ink-jet head, is mixed with the first ink.

7. A display device having a color filter having a substrate and manufactured by discharging ink from an ink-jet head onto a substrate so as to form a plurality of filter elements on the substrate, integrally comprising:

a color filter colored by discharging a first ink of a predetermined color from said ink-jet head onto the substrate, at a position for the filter elements on the substrate, where a second ink of the predetermined color, that was ejected from said ink-jet head in a form having a front side and a rear side, and extending in a direction from said ink-jet head to the substrate so that the front side of the ink arrives at the substrate before the rear side of the ink is separated from the ink-jet head, is mixed with the first ink; and light-amount change means for changing an amount of light.

8. An apparatus comprising a display device having a color filter having a substrate and manufactured by discharging ink from an ink-jet head onto a substrate so as to form a plurality of filter elements on the substrate, integrally comprising:

a display device integrally comprising a color filter colored by discharging a first ink of a predetermined color from said ink-jet head onto the substrate, at a position for the filter elements on the substrate, where a second quantity of ink of the predetermined color, that was ejected from said ink-jet head in a form having a front side and a rear side, and extending in a direction from said ink-jet head to the substrate so that the front side of the ink arrives at the substrate before the rear side of the ink is separated from the ink-jet head, is mixed with the first ink, and light-amount change means for changing an amount of light; and image-signal supply means for supplying an image signal to said display device.

9. A method for improving precision of ink-arrival positions on a color filter manufactured by discharging ink from an ink-jet head onto a substrate so as to form a plurality of filter elements on the substrate, comprising the steps of:

applying ink discharged from said ink-jet head in a form having a front side and a rear side, and extending in a direction from said ink-jet head to the substrate so that the front side of the ink arrives at the substrate before the rear side of the ink is separated from the ink-jet head, onto said substrate further comprising the step of previously applying to said substrate a first ink of a predetermined color, and wherein, in the step of applying said ink, said ink is of the predetermined color and is applied at a position within said filter elements so as to mix with the previously-applied ink.

10. A method for reducing coloring unevenness in filter elements of a color filter manufactured by discharging ink from an ink-jet head onto a substrate so as to form a plurality of filter elements on the substrate, comprising the step of:

discharging ink from said ink-jet head in a form having a front side and a rear side. and extending in a direction from said ink-jet head to the substrate so that the front side of the ink arrives at the substrate before, the rear side of the ink is separated from the ink-jet head, the ink having a same color as that of previously-applied ink, to be applied at a position within said filter elements where the ink is to mix with the previously-applied ink.

* * * * *

UNITED STATES PATENT AND TRADEMARK OFFICE
CERTIFICATE OF CORRECTION

PATENT NO. : 6,224,205 B1
DATED : May 1, 2001
INVENTOR(S) : Makoto Akahira et al.

It is certified that error appears in the above-identified patent and that said Letters Patent is hereby corrected as shown below:

Title page,
Item [57], ABSTRACT,
Line 7, "ink." should read -- inks. --.

Column 1,
Line 11, "ink," should read -- inks, --.

Column 2,
Line 25, "separate" should read -- separates --.
Line 27, "are" should read -- is --.
Line 47, "manufactures" should read -- manufacture --.
Line 59, "ink," should read -- inks, --.

Column 3,
Lines 4, 15, 25, 36 and 60, "ink," should read -- inks, --.

Column 4,
Lines 3, 12 and 21, "ink," should read -- inks, --.

Column 5,
Lines 17 and 19, "ink" should read -- inks --.

Column 7,
Line 4, "rein" should read -- resin --.
Line 6, "ink" should read -- inks --.
Line 49, "relatively" should read -- a relatively --.

Column 8,
Line 47, "to" should be deleted.

Column 11,
Line 48, "applied" should read -- been applied --.
Line 50, "where" should read -- of --.

UNITED STATES PATENT AND TRADEMARK OFFICE
CERTIFICATE OF CORRECTION

PATENT NO.   : 6,224,205 B1
DATED        : May 1, 2001
INVENTOR(S)  : Makoto Akahira et al.

It is certified that error appears in the above-identified patent and that said Letters Patent is hereby corrected as shown below:

Column 12,
Line 5, "in" should read -- at --.
Line 51, "drive" should read -- drives --.

Column 13,
Line 16, "shifted," should read -- be shifted, --.
Line 48, "equation,:" should read -- equation: --.

Column 14,
Line 6, "group" (first occurrence) should read -- groups --.
Line 22, "anti" should read -- anti- --
Line 59, "the" should be deleted.

Column 15,
Line 61, "enables" should read -- enabling --.

Column 18,
Line 21, "side." should read -- side, --.
Line 23, "before," should read -- before --.
Line 26, "elements" should read -- elements, --.

Signed and Sealed this

Third Day of September, 2002

*Attest:*

JAMES E. ROGAN
*Attesting Officer*   *Director of the United States Patent and Trademark Office*